United States Patent
Kilpatrick et al.

(10) Patent No.: US 9,274,135 B2
(45) Date of Patent: Mar. 1, 2016

(54) METHOD AND SYSTEM FOR CONFORMAL IMAGING VIBROMETRY

(71) Applicants: James Kilpatrick, Lake Forest, CA (US); Adela Apostol, Foothill Ranch, CA (US); Vladimir Markov, Irvine, CA (US)

(72) Inventors: James Kilpatrick, Lake Forest, CA (US); Adela Apostol, Foothill Ranch, CA (US); Vladimir Markov, Irvine, CA (US)

(73) Assignee: Advanced Systems & Technologies, Inc., Irvine, CA (US)

( * ) Notice: Subject to any disclaimer, the term of this patent is extended or adjusted under 35 U.S.C. 154(b) by 282 days.

(21) Appl. No.: 14/054,672

(22) Filed: Oct. 15, 2013

(65) Prior Publication Data

US 2015/0285613 A1 Oct. 8, 2015

Related U.S. Application Data

(60) Provisional application No. 61/713,040, filed on Oct. 12, 2012.

(51) Int. Cl.
| | | |
|---|---|---|
| *G01B 9/02* | (2006.01) | |
| *G01P 3/36* | (2006.01) | |
| *G01B 11/14* | (2006.01) | |
| *G01H 9/00* | (2006.01) | |
| *G01M 7/02* | (2006.01) | |

(52) U.S. Cl.
CPC . *G01P 3/36* (2013.01); *G01B 11/14* (2013.01); *G01H 9/00* (2013.01); *G01M 7/025* (2013.01)

(58) Field of Classification Search
CPC ..... G01H 9/00; G01H 9/004; G01B 9/02041; G01B 9/02045; G01P 3/366; G01P 3/36
See application file for complete search history.

(56) References Cited

U.S. PATENT DOCUMENTS

| | | | |
|---|---|---|---|
| 6,972,846 B2 | 12/2005 | Lal et al. | |
| 7,116,426 B2 | 10/2006 | Lal et al. | |
| 7,193,720 B2 | 3/2007 | Gatt | |
| 7,221,445 B2 | 5/2007 | Earthman et al. | |
| 7,477,398 B2 | 1/2009 | Lal et al. | |
| 7,961,362 B2 | 6/2011 | Xu | |
| 8,446,575 B1 | 5/2013 | Reu et al. | |
| 8,462,323 B2 | 6/2013 | Markov et al. | |
| 2008/0043247 A1* | 2/2008 | Arnold | G01B 11/2441 356/512 |
| 2008/0316500 A1* | 12/2008 | Schulte | G01B 11/2441 356/521 |
| 2011/0102806 A1* | 5/2011 | Meldahl | G01B 11/2441 356/511 |
| 2011/0174078 A1* | 7/2011 | Chinn | G01H 9/004 73/657 |

FOREIGN PATENT DOCUMENTS

WO WO 2002063237 8/2002

* cited by examiner

*Primary Examiner* — Kara E Geisel
*Assistant Examiner* — Shawn Decenzo
(74) *Attorney, Agent, or Firm* — Snell & Wilmer LLP

(57) ABSTRACT

Systems and methods for conformal imaging vibrometry capable of real-time measurements of the dynamic motions of any arbitrary two-dimensional or three-dimensional structure. The disclosed systems and methods are able to fully characterize the dynamic behavior of an object of any arbitrary geometry. The test object is illuminated with multiple laser beams whose directions conform to the local normal axis of the surface. The approach enables high-speed vibration imaging of whole-body dynamics of arbitrarily shaped structures in real-time, with no multiplexed data capture or synthesized motion reconstruction, as is currently practiced. By measuring the object's vibrations simultaneously at multiple points, the disclosed systems and methods are able to reproduce the structural behavior under operational conditions, which can then be spectrally decomposed to determine the modal, complex modal and transient nature of the true structural dynamics.

26 Claims, 11 Drawing Sheets

METHOD AND SYSTEM FOR CONFORMAL IMAGING VIBROMETRY

CLAIM OF PRIORITY UNDER 35 U.S.C. §119(e)

This application claims the benefit and priority of U.S. Provisional Patent Application No. 61/713,040, entitled "METHOD AND APPARATUS FOR CONFORMAL IMAGING VIBROMETRY," filed on Oct. 12, 2012, the entire contents and disclosures of which are hereby incorporated by reference herein.

STATEMENT REGARDING GOVERNMENT RIGHTS

This invention was made with Government support under Contract Nos. N68335-11-C-0268, W31P4Q-11-C-0061, and W15P7T-13-C-A408, all awarded by the Army Contracting Command Office—APG on behalf of the Defense Advanced Research Projects Agency ("DARPA"), and the Naval Air Warfare Center Aircraft Division ("NAVAIR"). The Government has certain rights in this invention.

BACKGROUND

1. Field of the Invention

The present invention relates generally to optics and more particularly, to conformal fiber-optics vibrometry for real-time full-field measurement of the displacement and vibration of arbitrarily-shaped surfaces wherein the measurements are acquired by a conformal fiber-optics vibrometer array.

2. Description of the Related Art

A laser Doppler vibrometer ("LDV") is essentially a laser interferometer designed specifically for remote, non-contact measurement of solid body dynamic displacement, velocity, and other physical parameters of interest using homodyne or heterodyne demodulation techniques. Laser interferometers include those broadly categorized as Michelson, Mach-Zehnder, Fabry-Perot, Sagnac, and Fizzeau. Interferometers commonly employ heterodyne detection techniques in which the frequency of the reference channel is offset from that of the signal channel. These interferometers can be bulk-optic or hybrid bulk, fiber-optics interferometers.

Recently, all-fiber and hybrid bulk, fiber-optics interferometers have been developed using, for example, a varied combination of fiber couplers, isolators, circulators, polarizers, phase and intensity modulators, fiber amplifiers, Bragg gratings, DFB laser diodes and wavelength-tunable fiber lasers. Thus, such fiber-optics technology is increasingly being employed with LDVs to provide a convenient and flexible non-contact method to measure displacement and vibration of a remote surface at a point on the structure illuminated by a single laser beam.

Currently, the global dynamics of an extended structure can only be determined by numerical (modal) analyses of data taken with a single point sensor, such as an accelerometer or LDV which thus has to be sequentially moved or scanned across the surface as the data are measured point by point. In traditional modal analyses, the frequency response function of the structure (FRF), which is the ratio of output response to input excitation, is determined at a number of separate locations; thus, additional means are required to measure the input force such as an attached accelerometer or secondary reference vibrometer. However, there are limitations with traditional modal analyses. For example, traditional modal analyses assume that (i) the input excitation can be accurately measured, which may be difficult or impossible in operational environments, (ii) the excitation and structural response is repeatable and largely insensitive to environmental factors for the duration of the measurement, and (iii) the structural dynamics are linear and time invariant (i.e. the principal of modal superposition is applicable).

Traditional modal analysis methods thus use a roving accelerometer in conjunction with fixed point impact (or vice versa), or swept sine excitation or using non-contact laser vibrometry, such as a single-beam LDV. However, there are limitations with such approaches. For example, with a single beam LDV, characterization of the motion of an extended area of the structure relies on the use of XY scanning galvanometer mirrors to reposition the laser beam over a grid of points on the surface. The inference of global structural dynamic behavior is further subject to additional restrictive assumptions concerning the actual structural behavior between sequentially scanned measurements.

In addition to the limitation of the restrictive assumptions implicit in traditional modal analyses, point measurements performed sequentially require application of repetitive stimulus for each point measurement, making this approach slow and unsuitable for the study of many system dynamics or diagnostic problems which entail transient, non-repetitive, complex (i.e., travelling wave) effects, or any combinations thereof. Additionally, accurate recovery of the surface velocity is predicated on the assumption that the measurement beam is substantially perpendicular to the surface. Where the incident beam makes an angle with the surface, the velocity estimate is in error by an amount proportional to the cosine of the angle which the beam makes with the surface normal. Another limitation of the current state-of-the-art LDV is its inability to measure the vibratory motion of structures comprising convoluted or non-planar shapes, in particular where these are sufficiently small, reflective and/or delicate structures, such as micro-electromechanical sensors (MEMS).

Recently, various designs for simultaneous multiple point LDV measurements on a structure at multiple locations have been proposed. However, such designs have the following limitations. They are not capable of vibration imaging where "imaging" is taken to imply a sufficient number of simultaneous measurement points to resolve the smallest scale spatial vibrations of interest over a two-dimensional ("2D") area. Implicit in the term "imaging vibrometry" is the assumption that each individual sensor or pixel measures the surface motion at rates exceeding the highest temporal frequencies of interest and that the density of the sensor array likewise exceeds the maximum spatial vibration frequency of interest. Thus, such designs do not provide an imaging capability but instead employ, for example, a linear vibrometer array in conjunction with mechanical rotation or scanning to acquire 2D data. Such approaches are thus susceptible to the same limitations of single point scanning systems as detailed previously.

The aforementioned current state-of-the-art LDV includes, for example, (i) U.S. Pat. No. 8,446,575, entitled "Imaging Doppler velocimeter with downward heterodyning in the optical domain," (ii) U.S. Pat. No. 7,193,720, entitled "Optical vibration imager," (iii) U.S. Pat. No. 7,116,426, entitled "Multi-beam heterodyne laser Doppler vibrometer," (iv) U.S. Pat. No. 7,961,362, entitled "Method and apparatus for phase correction in a scanned beam imager," and (v) PCT Application Publication No. WO2002063237 A2, entitled "Interferometer."

The current state-of-the-art LDVs attempt to address the limitations of single beam measurements by providing a limited extension of LDV to spatially distributed measurements, but such approaches are not capable of vibration imaging and, in addition, are only applicable to planar or substantially planar surfaces and structures. Thus, the current state-of-the-art LDV fails to provide simultaneous measurements of the real-time, full-field vibrometry motion of (i) structures with arbitrary geometry, and, in particular, structures with curved surfaces such as circular, cylindrical, spherical, or arbitrary curved two-dimensional or three-dimensional surfaces, and (ii) structures which exhibit rapid, abrupt or discontinuous variations of surface curvature. Additional exemplary structures include spherical, cylindrical and multi-faceted micro-scale MEMS, convoluted turbine blades, leading edges of aerospace control surfaces, and composite components employed in aerospace applications, such as thruster nozzles and nose cones. Therefore, there is a need to address the foregoing limitations.

The present invention addresses the foregoing limitations by introducing a conformal imaging vibrometer ("CIV") that extends real-time imaging vibrometry to any structural geometry of practical interest which is not amenable to measurement by current state-of-the-art laser vibrometers employing a fixed line of sight.

SUMMARY OF THE INVENTION

The present invention aims to address the above-cited limitations in current state-of-the-art LDV by providing the ability to fully characterize the dynamic behavior of an object of any arbitrary geometry, deploying a laser beam array tailored to the specific structural geometry of interest (planar, circular, cylindrical, spherical or an arbitrary curved/warped 2D or 3D surface). For the purpose of characterization, the object is illuminated with multiple laser beams whose directions conform to the local normal axis of the surface. This approach enables high-speed vibration imaging of whole-body dynamics of arbitrarily shaped structures in real-time, with no multiplexed data capture or synthesized motion reconstruction, as is currently practiced. By measuring the object's vibrations simultaneously at multiple points, the CIV is able to reproduce the structural behavior under operational conditions, which can then be spectrally decomposed to determine the modal, complex modal and transient nature of the true structural dynamics. The speed at which these measurements can be made permits a wide range of further characterization tests. For example, the effect of pressure and temperature variations on the object's dynamics can be studied in real-time, where previously these parameters had to be held or assumed constant throughout the measurement process. The CIV uses heterodyne interferometry, in which the velocity of the vibrating surface is encoded in the Doppler sidebands of a frequency modulated carrier. The microprocessor recovers the displacement (or velocity) data by demodulating the measured, digitized signals to yield the local surface displacement (or velocity) time histories, while the full data set provides an animated display of the real-time surface deformation (or velocity) of the sample under transient (or, more generally, arbitrary) stimulus.

The contents of this summary section are provided only as a simplified introduction to the invention, and are not intended to be used to limit the scope of the appended claims. The present disclosure has been described above in terms of presently preferred embodiments so that an understanding of the present disclosure can be conveyed. However, there are other embodiments not specifically described herein for which the present disclosure is applicable. Therefore, the present disclosure should not be seen as limited to the forms shown, which should be considered illustrative rather than restrictive.

An exemplary embodiment of the present invention's system for conformal imaging vibrometry capable of real-time measurements of the dynamic motions of any arbitrary two-dimensional or three-dimensional structure comprises a conformal beam illumination scheme configured for conformal imaging vibrometry of real-time dynamic behavior of a structure having an arbitrary geometry, wherein the conformal beam illumination scheme has a fiber array and a plurality of conformal illuminating probes; a multi-channel interferometer, wherein the multi-channel interferometer is a multi-channel heterodyne interferometer, wherein the multi-channel heterodyne interferometer is an all-fiber multi-channel heterodyne interferometer having a laser source, an optical isolator, a first fiber-optics splitter configured to split a laser beam emitted from the laser source into an object beam and a reference beam, a modulator, a second fiber-optics splitter configured to split the object beam, a third fiber-optics splitter configured to split the reference beam, a plurality of fiber-optics circulators, a plurality of fiber-optics re-combiners, and a plurality of receivers configured for receiving signals from the plurality of fiber-optics re-combiners; a multi-channel receiver array; and a computer having a display, a multi-channel digitizer, and a microprocessor configured for digital signal processing and data analysis. Additionally, at least one conformal illuminating probe has a terminal end with (a) a bare fiber angle polished to any angle from 8 degrees to 45 degrees, (b) a mirrored right-angle micro-prism, or (c) a microlens.

Another exemplary embodiment of the present invention's system for conformal imaging vibrometry capable of real-time measurements of the dynamic motions of any arbitrary two-dimensional or three-dimensional structure comprises a conformal beam illumination scheme configured for conformal imaging vibrometry of real-time dynamic behavior of a structure having an arbitrary geometry, wherein the conformal beam illumination scheme has a plurality of planar conformal illuminating probes, a polarizing maintaining (PD) fiber array, a fiber ferrule, a flat-field lens, and a quarter-waveplate; a multi-channel interferometer, wherein the multi-channel interferometer is a multi-channel heterodyne interferometer, wherein the multi-channel heterodyne interferometer is an all-fiber multi-channel heterodyne interferometer having a laser source, an optical isolator, a first fiber-optics splitter configured to split a laser beam emitted from the laser source into an object beam and a reference beam, a modulator, a second fiber-optics splitter configured to split the object beam, a third fiber-optics splitter configured to split the reference beam, a plurality of fiber-optics circulators, a plurality of fiber-optics re-combiners, and a plurality of receivers configured for receiving signals from the plurality of fiber-optics re-combiners; a multi-channel receiver array; and a computer having a display, a multi-channel digitizer, and a microprocessor configured for digital signal processing and data analysis.

Another exemplary embodiment of the present invention's system for conformal imaging vibrometry capable of real-time measurements of the dynamic motions of any arbitrary two-dimensional or three-dimensional structure comprises a conformal beam illumination scheme configured for conformal imaging vibrometry of real-time dynamic behavior of a structure having an arbitrary geometry, wherein the conformal beam illumination scheme has a plurality of planar conformal illuminating probes, a single mode (SM) fiber array, a fiber ferrule, a flat-field lens, and a Faraday rotator; a multi-channel interferometer, wherein the multi-channel interferometer is a multi-channel heterodyne interferometer, wherein the multi-channel heterodyne interferometer is an all-fiber multi-channel heterodyne interferometer having a laser source, an optical isolator, a first fiber-optics splitter configured to split a laser beam emitted from the laser source into an object beam and a reference beam, a modulator, a second fiber-optics splitter configured to split the object beam, a third fiber-optics splitter configured to split the reference beam, a plurality of fiber-optics circulators, a plurality of fiber-optics re-combiners, and a plurality of receivers configured for receiving signals from the plurality of fiber-optics re-combiners; a multi-channel receiver array; and a computer having a display, a multi-channel digitizer, and a microprocessor configured for digital signal processing and data analysis.

Another exemplary embodiment of the present invention's system for conformal imaging vibrometry capable of real-time measurements of the dynamic motions of any arbitrary two-dimensional or three-dimensional structure comprises a conformal beam illumination scheme configured for conformal imaging vibrometry of real-time dynamic behavior of a structure having an arbitrary geometry, the conformal beam illumination scheme has a plurality of dynamically reconfigurable conformal illuminating probes, a single mode (SM) fiber array, a collimating array, a Faraday rotator, a steerable micro-electro-mechanical-system (MEMS) mirror array, and an objective lens; a multi-channel interferometer, wherein the multi-channel interferometer is a multi-channel heterodyne interferometer, wherein the multi-channel heterodyne interferometer is an all-fiber multi-channel heterodyne interferometer having a laser source, an optical isolator, a first fiber-optics splitter configured to split a laser beam emitted from the laser source into an object beam and a reference beam, a modulator, a second fiber-optics splitter configured to split the object beam, a third fiber-optics splitter configured to split the reference beam, a plurality of fiber-optics circulators, a plurality of fiber-optics re-combiners, and a plurality of receivers configured for receiving signals from the plurality of fiber-optics re-combiners; a multi-channel receiver array; and a computer having a display, a multi-channel digitizer, and a microprocessor configured for digital signal processing and data analysis.

Another exemplary embodiment of the present invention's system for conformal imaging vibrometry capable of real-time measurements of the dynamic motions of any arbitrary two-dimensional or three-dimensional structure comprises a conformal beam illumination scheme configured for conformal imaging vibrometry of real-time dynamic behavior of a structure having an arbitrary geometry, wherein the conformal beam illumination scheme has a fiber array, and a plurality of conformal illuminating probes; a multi-channel interferometer, wherein the multi-channel interferometer is a multi-channel heterodyne interferometer, wherein the multi-channel heterodyne interferometer is a hybrid fiber-bulk optic multi-channel heterodyne interferometer having a laser source, a fiber-optics splitter configured to split a laser beam emitted from the laser source into an object beam and a reference beam, a modulator, at least one collimating telescope configured for collimating the object beam, at least one collimating telescope configured for collimating the reference beam, at least one polarizing beam splitter, at least one non-polarizing beam splitter, a plurality of collimating arrays, and a plurality of receivers; a multi-channel receiver array; and a computer having a display, a multi-channel digitizer, and a microprocessor configured for digital signal processing and data analysis. Additionally, at least one conformal illuminating probe has a terminal end with (a) a bare fiber angle polished to any angle from 8 degrees to 45 degrees, (b) a mirrored right-angle micro-prism, or (c) a microlens.

Another exemplary embodiment of the present invention's system for conformal imaging vibrometry capable of real-time measurements of the dynamic motions of any arbitrary two-dimensional or three-dimensional structure comprises a conformal beam illumination scheme configured for conformal imaging vibrometry of real-time dynamic behavior of a structure having an arbitrary geometry, wherein the conformal beam illumination scheme has a plurality of planar conformal illuminating probes, a polarizing maintaining (PD) fiber array, a fiber ferrule, a flat-field lens, and a quarter-waveplate; a multi-channel interferometer, wherein the multi-channel interferometer is a multi-channel heterodyne interferometer, wherein the multi-channel heterodyne interferometer is a hybrid fiber-bulk optic multi-channel heterodyne interferometer having a laser source, a fiber-optics splitter configured to split a laser beam emitted from the laser source into an object beam and a reference beam, a modulator, at least one collimating telescope configured for collimating the object beam, at least one collimating telescope configured for collimating the reference beam, at least one polarizing beam splitter, at least one non-polarizing beam splitter, a plurality of collimating arrays, and a plurality of receivers; a multi-channel receiver array; and a computer having a display, a multi-channel digitizer, and a microprocessor configured for digital signal processing and data analysis.

Another exemplary embodiment of the present invention's system for conformal imaging vibrometry capable of real-time measurements of the dynamic motions of any arbitrary two-dimensional or three-dimensional structure comprises a conformal beam illumination scheme configured for conformal imaging vibrometry of real-time dynamic behavior of a structure having an arbitrary geometry, wherein the conformal beam illumination scheme has a plurality of planar conformal illuminating probes, a single mode (SM) fiber array, a fiber ferrule, a flat-field lens, and a Faraday rotator; a multi-channel interferometer, wherein the multi-channel interferometer is a multi-channel heterodyne interferometer, wherein the multi-channel heterodyne interferometer is a hybrid fiber-bulk optic multi-channel heterodyne interferometer having a laser source, a fiber-optics splitter configured to split a laser beam emitted from the laser source into an object beam and a reference beam, a modulator, at least one collimating telescope configured for collimating the object beam, at least one collimating telescope configured for collimating the reference beam, at least one polarizing beam splitter, at least one non-polarizing beam splitter, a plurality of collimating arrays, and a plurality of receivers; a multi-channel receiver array; and a computer having a display, a multi-channel digitizer, and a microprocessor configured for digital signal processing and data analysis.

Another exemplary embodiment of the present invention's system for conformal imaging vibrometry capable of real-time measurements of the dynamic motions of any arbitrary two-dimensional or three-dimensional structure comprises a conformal beam illumination scheme configured for conformal imaging vibrometry of real-time dynamic behavior of a structure having an arbitrary geometry, wherein the conformal beam illumination scheme has a fiber array, and a plurality of conformal illuminating probes; a multi-channel interferometer, wherein the multi-channel interferometer is a multi-channel homodyne interferometer; a multi-channel receiver array; and a computer having a display, a multi-channel digitizer, and a microprocessor configured for digital signal processing and data analysis. Additionally, at least one conformal illuminating probe has a terminal end with (a) a bare fiber angle polished to any angle from 8 degrees to 45 degrees, (b) a mirrored right-angle micro-prism, or (c) a microlens.

Another exemplary embodiment of the present invention's system for conformal imaging vibrometry capable of real-time measurements of the dynamic motions of any arbitrary two-dimensional or three-dimensional structure comprises a conformal beam illumination scheme configured for conformal imaging vibrometry of real-time dynamic behavior of a structure having an arbitrary geometry, wherein the conformal beam illumination scheme has a plurality of planar conformal illuminating probes, a polarizing maintaining (PD) fiber array, a fiber ferrule, a flat-field lens, and a quarter-waveplate; a multi-channel interferometer, wherein the multi-channel interferometer is a multi-channel homodyne interferometer; a multi-channel receiver array; and a computer having a display, a multi-channel digitizer, and a microprocessor configured for digital signal processing and data analysis.

Another exemplary embodiment of the present invention's system for conformal imaging vibrometry capable of real-time measurements of the dynamic motions of any arbitrary two-dimensional or three-dimensional structure comprises a conformal beam illumination scheme configured for conformal imaging vibrometry of real-time dynamic behavior of a structure having an arbitrary geometry, wherein the conformal beam illumination scheme has a plurality of planar conformal illuminating probes, a single mode (SM) fiber array, a fiber ferrule, a flat-field lens, and a Faraday rotator; a multi-channel interferometer, wherein the multi-channel interferometer is a multi-channel heterodyne interferometer, a multi-channel interferometer, wherein the multi-channel interferometer is a multi-channel homodyne interferometer; a multi-channel receiver array; and a computer having a display, a multi-channel digitizer, and a microprocessor configured for digital signal processing and data analysis.

Another exemplary embodiment of the present invention's system for conformal imaging vibrometry capable of real-time measurements of the dynamic motions of any arbitrary two-dimensional or three-dimensional structure comprises a conformal beam illumination scheme configured for conformal imaging vibrometry of real-time dynamic behavior of a structure having an arbitrary geometry, the conformal beam illumination scheme has a plurality of dynamically reconfigurable conformal illuminating probes, a single mode (SM) fiber array, a collimating array, a Faraday rotator, a steerable micro-electro-mechanical-system (MEMS) mirror array, and an objective lens; a multi-channel interferometer, wherein the multi-channel interferometer is a multi-channel homodyne interferometer; a multi-channel receiver array; and a computer having a display, a multi-channel digitizer, and a microprocessor configured for digital signal processing and data analysis.

An exemplary embodiment of the present invention's method for conformal imaging vibrometry capable of real-time measurements of the dynamic motions of any arbitrary two-dimensional or three-dimensional structure comprises the steps of setting a suitable conformal beam illumination scheme based on a geometry of a test object; setting a plurality of object beams from a multi-channel interferometer with the determined conformal beam illumination scheme; setting each object beam in a direction that conforms to a local normal axis of a surface of the test object; illuminating the test object using the plurality of object beams; and executing a simultaneous multi-point measurement of the test object, wherein the simultaneous multi-point measurement includes at least a measurement of real-time, dynamic motions of the test object.

Another exemplary embodiment of the present invention's method for conformal imaging vibrometry capable of real-time measurements of the dynamic motions of any arbitrary two-dimensional or three-dimensional structure comprises the steps of setting a suitable conformal beam illumination scheme based on a geometry of a test object; setting a plurality of object beams from a multi-channel interferometer with the determined conformal beam illumination scheme; setting each object beam in a direction that conforms to a local normal axis of a surface of the test object; illuminating the test object using the plurality of object beams; executing a simultaneous multi-point measurement of the test object, wherein the simultaneous multi-point measurement includes at least a measurement of real-time, dynamic motions of the test object; and demodulating the simultaneous multi-point measurements using a microprocessor configured for digital signal processing and data analysis.

An exemplary embodiment of the present invention's method for conformal imaging vibrometry capable of real-time measurements of the dynamic motions of any arbitrary two-dimensional or three-dimensional structure employing operational modal analysis (OMA) comprises the steps of setting at least one suitable conformal beam illumination scheme based on a geometry of a test object in its natural operating environment; setting a plurality of object beams from a multi-channel interferometer with at least one determined conformal beam illumination scheme; setting each object beam in a direction that conforms to a local normal axis of a surface of the test object; illuminating the test object using the plurality of object beams; executing a simultaneous multi-point measurement of structural responses of the test object; and performing operational modal analysis on the multi-point measurements.

BRIEF DESCRIPTION OF THE DRAWINGS

Other systems, methods, features and advantages of the present invention will be or will become apparent to one of ordinary skill in the art upon examination of the following figures and detailed descriptions. It is intended that all such additional apparatuses, systems, methods, features and advantages be included within this description, be within the scope of the present invention, and be protected by the appended claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1A:
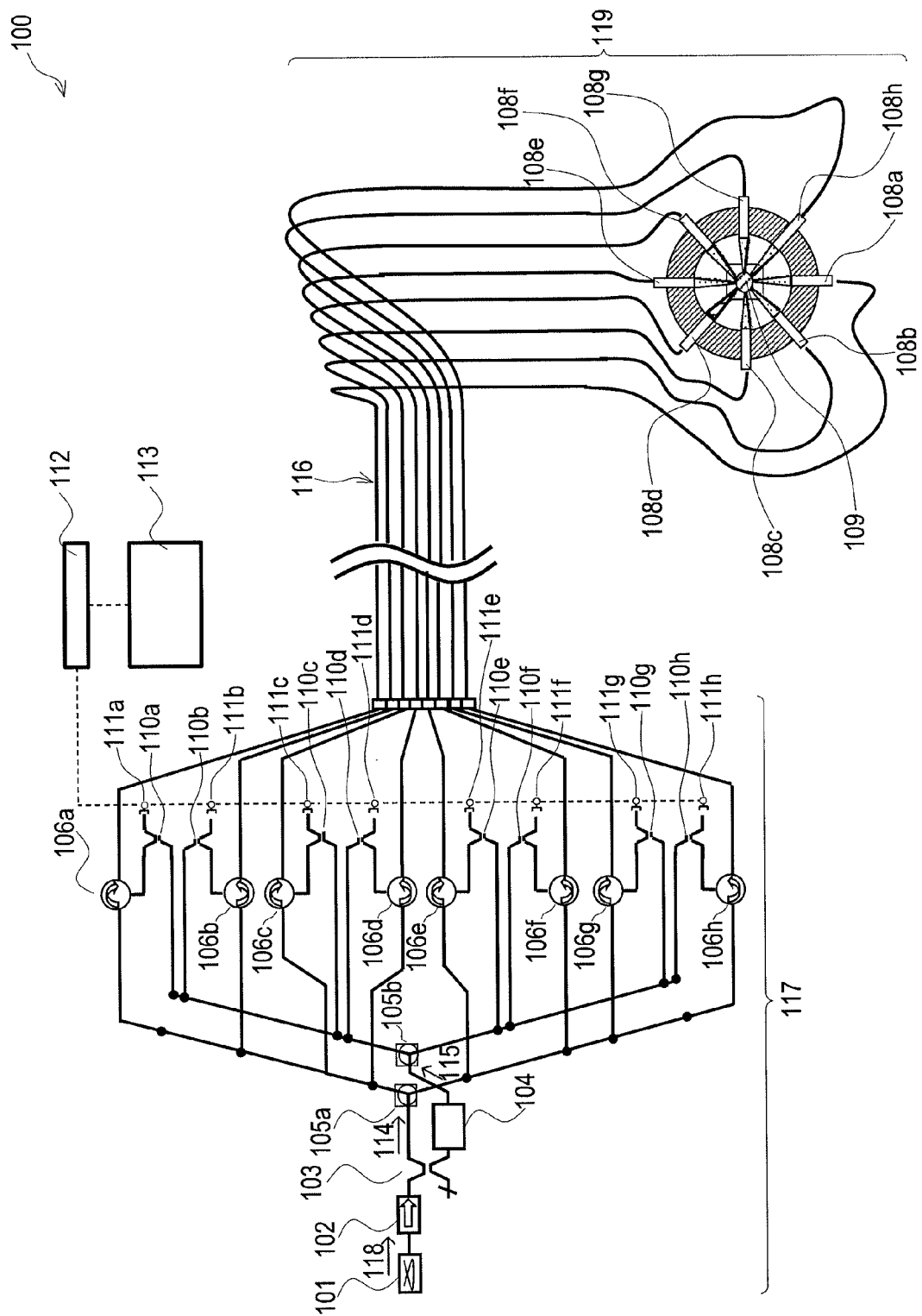
FIG. 1A is a schematic depicting an exemplary embodiment of the present invention's system for conformal imaging vibrometry capable of real-time measurements of the dynamic motions of any arbitrary two-dimensional or three-dimensional structure.

FIG. 1A is a schematic depicting an exemplary embodiment of the present invention's system for conformal imaging vibrometry capable of real-time measurements of the dynamic motions of any arbitrary two-dimensional or three-dimensional structure. The present invention's system represents a substantial departure from conventional bulk-optic vibrometer designs because it supports multi-channel configurations without significant impact on system size or complexity. The present invention's system achieves this outcome by incorporating fiber-optics component technology from the telecommunications field as part of an all-digital, multi-channel implementation of the traditional single-channel heterodyne vibrometer. Specifically, the present invention's system incorporates fiber-optics architecture from the laser source input to the receiver coupling scheme. The present invention's system uses active and passive fiber-optics components throughout to guarantee a robust optical alignment. The exemplary embodiment of FIG. 1A captures these novel features of the present invention's system.

Figure 1B:
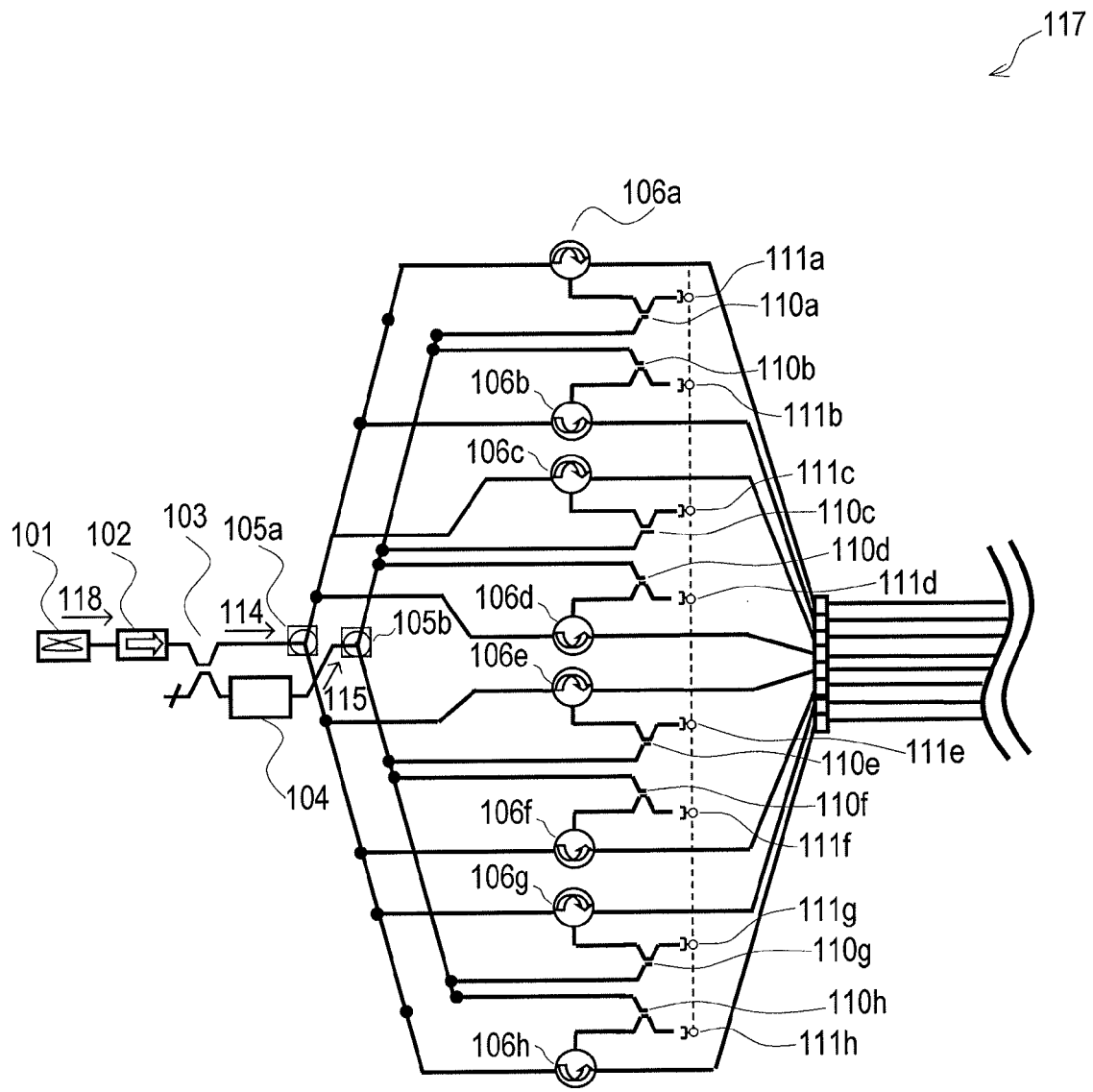
FIG. 1B is a schematic depicting an exemplary embodiment of the present invention's multi-channel interferometer for conformal imaging vibrometry capable of real-time measurements of the dynamic motions of any arbitrary two-dimensional or three-dimensional structure.

In the exemplary embodiment of the present invention's system in FIG. 1A, system 100 has a multi-channel interferometer 117, conformal beam illumination scheme 119, a multi-channel receiver array 112, and a computer 113 having (i) a multi-channel digitizer for digitizing the signals received from multi-channel receiver array 112, (ii) a microprocessor for digital signal processing and data analysis of the conformal imaging vibrometry, and (iii) a computer display. Multi-channel interferometer 117 has a laser source 101, an optical isolater 102, a first fiber-optics splitter 103, a modulator 104, a second fiber-optics splitter 105a, a third fiber-optics splitter 105b, fiber-optics circulators 106a-106g, fiber-optics re-combiners 110a-110g, and receivers 111a-111g. FIG. 1B shows multi-channel interferometer 117 apart from system 100 on FIG. 1A.

Multi-channel interferometer 117 can be a multi-channel heterodyne interferometer or a multi-channel homodyne interferometer. A multi-channel heterodyne interferometer can incorporate integrated fiber-optics component technology originally developed for the telecommunications field at 1550-nm but re-purposed in support of multi-channel parallel sensor designs or can employ active and passive single mode (SM) or polarization maintaining (PM) fiber-optics components at any wavelength. Use of a linearly polarized laser and PM fiber components throughout the interferometer offers a direct means of maintaining polarization alignment along the fiber optic interferometer. SM fiber components in conjunction with suitable variable polarization controllers can be also employed to align the polarization in the reference and object arms.

Additionally, multi-channel interferometer 117 can also be an all-fiber multi-channel interferometer, an all-bulk optic multi-channel interferometer, or a hybrid fiber-bulk optic interferometer. In the exemplary embodiment of FIG. 1A, multi-channel interferometer 117 is an all-fiber multi-channel heterodyne interferometer and in particular, multi-channel interferometer 117 is an all-fiber multi-channel heterodyne Mach-Zehnder interferometer. Multi-channel interferometer 117 has an all-fiber optic architecture extending from laser source 101 to the plurality of receivers 111a-111g.

Laser source 101 emits laser beam 118, which feeds into optical isolator 102 and subsequently into first fiber-optics splitter 103. Laser source 101 can be a narrow linewidth fiber laser. First fiber-optics splitter 103 can be a 1×2 fiber-optics splitter configured to split laser beam 118 into an object beam 114 and a reference beam 115. In this exemplary embodiment of FIG. 1, fiber-optics splitter 103 splits laser beam 118 into 80-90% object beam 114 and 10-20% reference beam 115. The fiber-optics splitter 103 can split beam 118 in any desired ratio.

Modulator 104 offsets the frequency of reference beam 115 required for FM carrier generation. Modulator 104 can be a highly compact and electronically efficient lithium-niobate waveguide phase modulator. In a lithium-niobate waveguide phase modulator, the reference beam is phase modulated by a serrodyne voltage ramp applied to the electrodes of this phase modulator. Alternatively, modulator 104 can be a serial configuration of two acousto-optic modulators, such as Bragg cells, plus dual radiofrequency (RF) drivers. Modulator 104 can also be any other optical fiber phase modulator capable of implementing a heterodyne carrier modulation scheme.

Second fiber-optics splitter 105a splits object beam 114 according to a desired number of channels. Similarly, third fiber-optics splitter 105b splits reference beam 115 according to a desired number of channels. The fiber-optics splitters 105a-105b can each be a 1×N fiber-optics splitter, wherein N can be 2, 4, 8, 16, 32 or any other integer in which the incident beam, either object beam 114 or reference beam 115, can be divided into by the 1×N fiber-optics splitter. In the exemplary embodiment of FIG. 1, fiber-optics splitters 105a-105b are each a 1×8 channel fiber-optics splitter. Thus, as shown in FIG. 1, second fiber-optics splitter 105a splits object beam 114 into 8 channels, and third fiber-optics splitter 105b splits reference beam 115 into 8 channels.

Multi-channel interferometer 117 can employ amplitude division multiplexing or wavelength division multiplexing. In the exemplary embodiment of FIG. 1, multi-channel interferometer 117 employs amplitude division multiplexing. As shown in FIG. 1, multi-channel interferometer 117 has a 1×8 channel fiber-optics splitting network. The multi-channel interferometer 117 can have a 1×N channel fiber-optics splitting network depending on the desired number of channels. The desired number of channels employed by fiber-optics splitters 105a-105b should be consistent with that of the multi-channel fiber-optics splitting network 116.

Figure 1C:
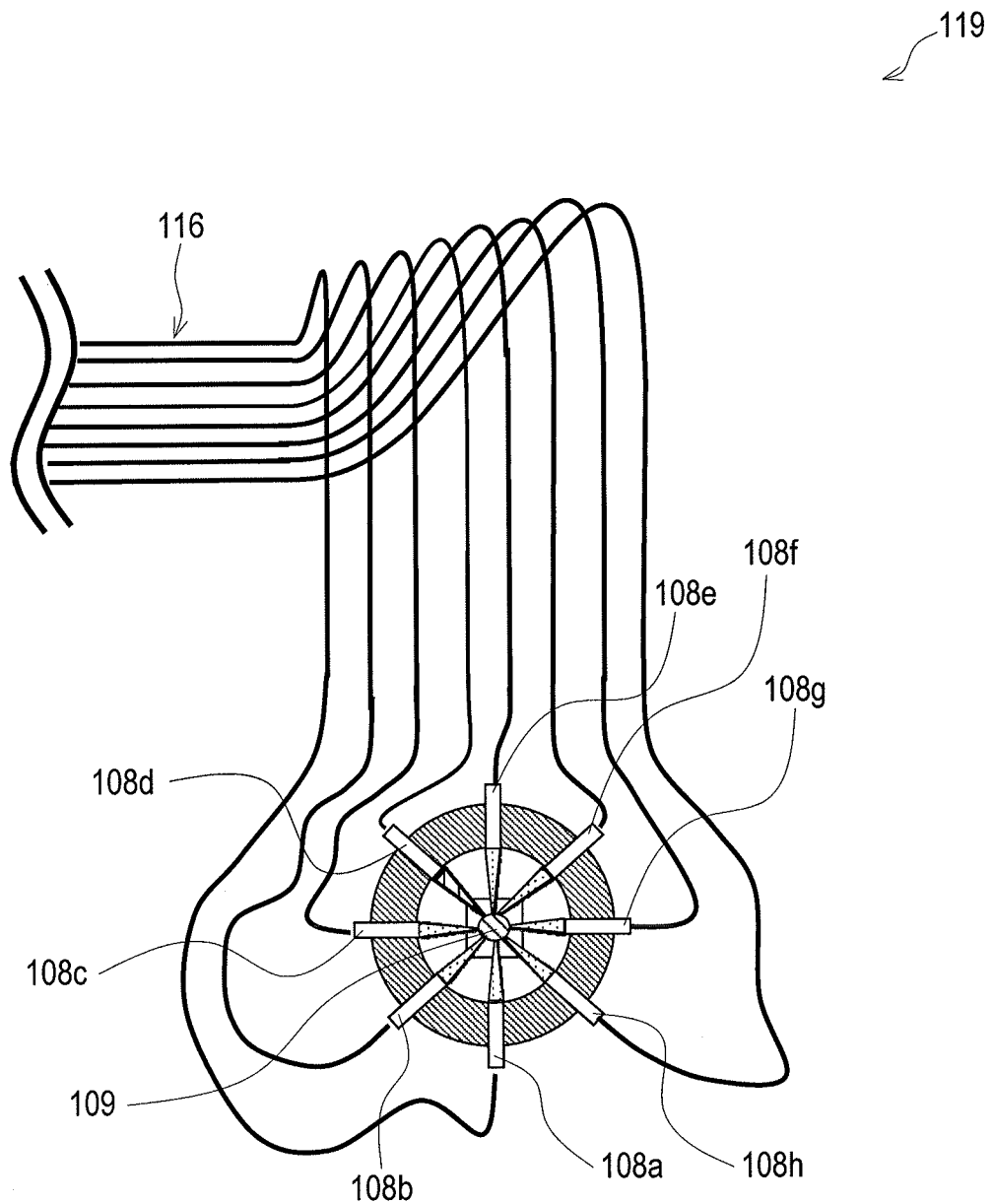
FIG. 1C is a schematic depicting an exemplary embodiment of the present invention's conformal beam illumination scheme and in particular, a radial two-dimensional conformal array.

Fiber-optics circulators 106a-106g deliver the respective sub-divided object beams to conformal beam illumination scheme 119. Conformal beam illumination scheme 119 is a two-dimensional radial conformal array. Conformal beam illumination scheme 119 has a fiber array 116, a plurality of conformal illuminating probes 108a-108g, and test object 109. Fiber array 116 has object beams delivered from a multi-channel interferometer, such as multi-channel interferometer 117 or 200. Fiber array 116 can be a single mode (SM) fiber array or a polarizing maintaining (PD) fiber array. Thus, in the exemplary embodiment of FIG. 1A, fiber-optics circulators 106a-106g deliver the respective sub-divided object beams to conformal illuminating probes 108a-108g. FIG. 1C shows conformal beam illumination scheme 119 apart from system 100 on FIG. 1A.

Test object 109 can be any structure having an arbitrary geometry. Thus, depending on the particular geometry of test object 109, conformal illuminating probes 108a-108g can be radial, circular, cylindrical, or spherical conformal illuminating probes. In the exemplary embodiment of FIGS. 1A and 1C, test object 109 is a wineglass micro-resonator and thus, conformal illuminating probes 108a-108g are radial conformal illuminating probes. As shown in FIG. 1, conformal illuminating probes 108a-108g are arranged radially around test object 109. Each conformal illuminating probe 108a-108g illuminates the respective sub-divided object beam on a single point on test object 109.

This arrangement of conformal illuminating probes 108a-108g, as shown in FIG. 1, is an exemplary embodiment of the present invention's conformal beam illumination scheme 119. However, the arrangement of conformal illuminating probes 108a-108g can be tailored to the specific structural geometry of interest (i.e., planar, circular, cylindrical, spherical or an arbitrary curved/warped 2D or 3D surface). Thus, system 100 allows for a two-dimensional or three-dimensional testing of test objects that are small structures with rapidly varying surface curvatures, such as a micro-resonator (i.e., MEMS resonator).

For the purpose of characterization, test object 109 is illuminated with multiple laser beams from conformal illuminating probes 108a-108g whose directions conform to the local normal axis of the surface. This approach enables high-speed vibration imaging of whole-body dynamics of arbitrarily shaped structures in real-time, with no multiplexed data capture or synthesized motion reconstruction, as is currently practiced. By measuring test object 109's vibrations simultaneously at multiple points, system 100 is able to reproduce the structural behavior under operational conditions, which can then be spectrally decomposed to determine the modal, complex modal and transient nature of the true structural dynamics.

The speed at which these measurements can be made permits a wide range of further characterization tests. For example, the effect of pressure and temperature variations on the object's dynamics can be studied in real-time, where previously these parameters had to be held or assumed constant throughout the measurement process. In this exemplary embodiment of FIG. 1, system 100 uses heterodyne interferometry (i.e. multi-channel interferometer 117), in which the velocity of the vibrating surface is encoded in the Doppler sidebands of a frequency modulated carrier. The microprocessor, such as the microprocessor in computer 113, recovers the displacement (or velocity) data by demodulating the measured, digitized signals to yield the local surface displacement (or velocity) time histories, while the full data set provides an animated display of the real-time surface deformation (or velocity) of the sample under transient (or, in fact, arbitrary) stimulus. In addition to general application, system 100 is uniquely applicable to the capture of short-lived, chaotic or transient surface movement or other vibrations which are not currently amenable to study by the current state of the art.

Conformal illuminating probes 108a-108g can be electrically passive as laser source 101 can be linked by a fiber optic feed through an umbilical to the probe station, while optical signals scattered back from the surface of test object 109 could be fiber guided from conformal illuminating probes 108a-108g back to multi-channel receiver array 112.

Optical signals scattered back from the surface of test object 109 are re-coupled back into the respective conformal illuminating probes 108a-108g, and subsequently carried back to multi-channel interferometer 117. Each fiber re-combiner 110a-110g combines the reflected light with the respective modulated output from the respective reference beam. In the exemplary embodiment of FIG. 1, fiber re-combiners 110a-110g are each a 2×1 3-dB fiber re-combiner. The fiber re-combiners 110a-110g can each be of any desired split ratio.

Receivers 111a-111g each receives its respective re-combined outputs from its respective fiber re-combiner 110a-110g. Receivers 111a-111g can be pigtailed photodiodes. The output signals from receivers 111a-111g are fed to a series of trans-impedance amplifiers and subsequently sent to multi-channel receiver array 112 where these output signals are digitized. Multi-channel receiver array 112 can be a multi-channel digital receiver array.

The outputs from multi-channel receiver array 112 comprise the signals of the heterodyne carrier and contain sideband modulation signals associated with the object vibrations. These outputs are transferred to computer 113 having (i) a multi-channel digitizer for digitizing the signals received from multi-channel receiver array 112, (ii) a microprocessor for digital signal processing and data analysis of the conformal imaging vibrometry, and (iii) a computer display. Recovery of the baseband displacements or velocities of the test structure at each of the illuminated points is performed in software by, for example, digital I and Q (in-phase and quadrature) demodulation, but may similarly employ a variety of other heterodyne demodulation methods. The baseband velocity-time data for each point in the conformal array can be replayed by computer 113. Further time and frequency domain analysis may be employed to reveal specific aspects of the object dynamics such as modal coalescence, splitting, damping and environmental sensitivities.

FIG. 1B is a schematic depicting an exemplary embodiment of the present invention's multi-channel interferometer for conformal imaging vibrometry capable of real-time measurements of the dynamic motions of any arbitrary two-dimensional or three-dimensional structure. As shown in FIG. 1B, an exemplary embodiment of the present invention's multi-channel interferometer is multi-channel interferometer 117. FIG. 1B shows multi-channel interferometer 117 apart from system 100 of FIG. 1A. Multi-channel interferometer 117 can connect with conformal beam illumination schemes 119, 300, 400, or 500.

FIG. 1C is a schematic depicting an exemplary embodiment of the present invention's conformal beam illumination scheme and, in particular, a radial two-dimensional conformal array. As shown in FIG. 1C, an exemplary embodiment of the present invention's conformal beam illumination scheme is conformal beam illumination scheme 119. FIG. 1C shows conformal beam illumination scheme 119 apart from system 100 of FIG. 1A. Conformal beam illumination scheme 119 can connect with multi-channel interferometers 117 or 200.

Figure 1D:
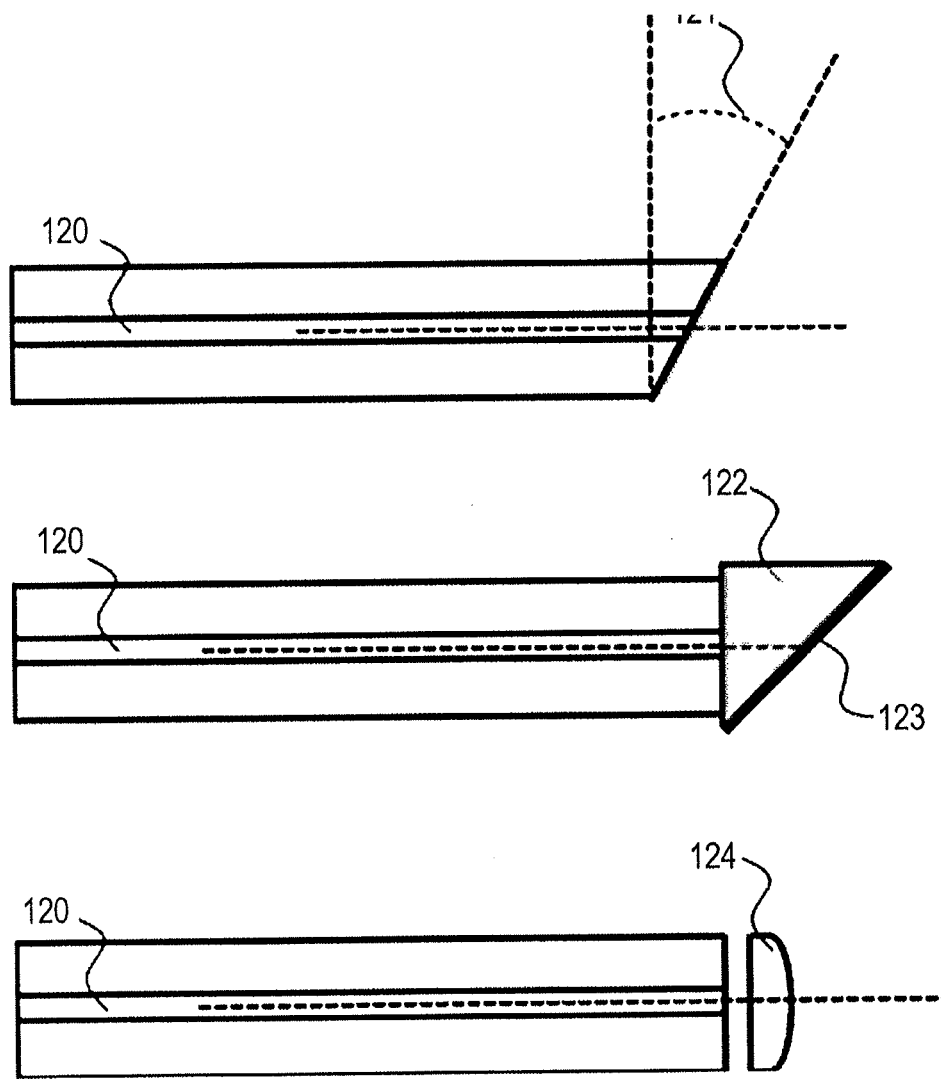
FIG. 1D is a schematic depicting different exemplary embodiments of the terminal ends of the present invention's conformal illuminating probes.

FIG. 1D is a schematic depicting different exemplary embodiments of the terminal ends of the present invention's conformal illuminating probes, such as the terminal ends of conformal illuminating probes 108a-108g. The respective terminal ends of conformal illuminating probes 108a-108g terminate the respective probe fibers, such as probe fibers 120. Each probe fiber 120 illuminates a test object, such as test object 109. Thus, the present invention discloses different ways in which probe fibers 120 can illuminate test object 109 through the use of different terminal ends of conformal illuminating probes 108a-108g.

FIG. 1D discloses three different exemplary embodiments of the terminal ends of conformal illuminating probes 108a-108g. In the first exemplary embodiment on FIG. 1D, a terminal end of a conformal illuminating probe has a bare fiber angle polished to approximately 8 degrees, as shown by identifier 121 on FIG. 1D. As a result, probe fiber 120 is terminated in a manner that minimizes the return loss from the fiber end face. The bare fiber angle can be polished to any angle ranging from 8 degrees to 45 degrees.

In the second exemplary embodiment on FIG. 1D, a terminal end of a conformal illuminating probe has a mirrored right-angle micro-prism, which includes a right-angle micro-prism 122 and a mirrored hypotenuse 123. As a result, probe fiber 120 is terminated in a manner that launches the output beam at right angles to the axis of the fiber.

In the third exemplary embodiment on FIG. 1D, a terminal end of a conformal illuminating probe has a micro-lens 124. As a result, probe fiber 120 is terminated in a manner that collimates or focuses the light emitted from the fiber end.

Figure 2:
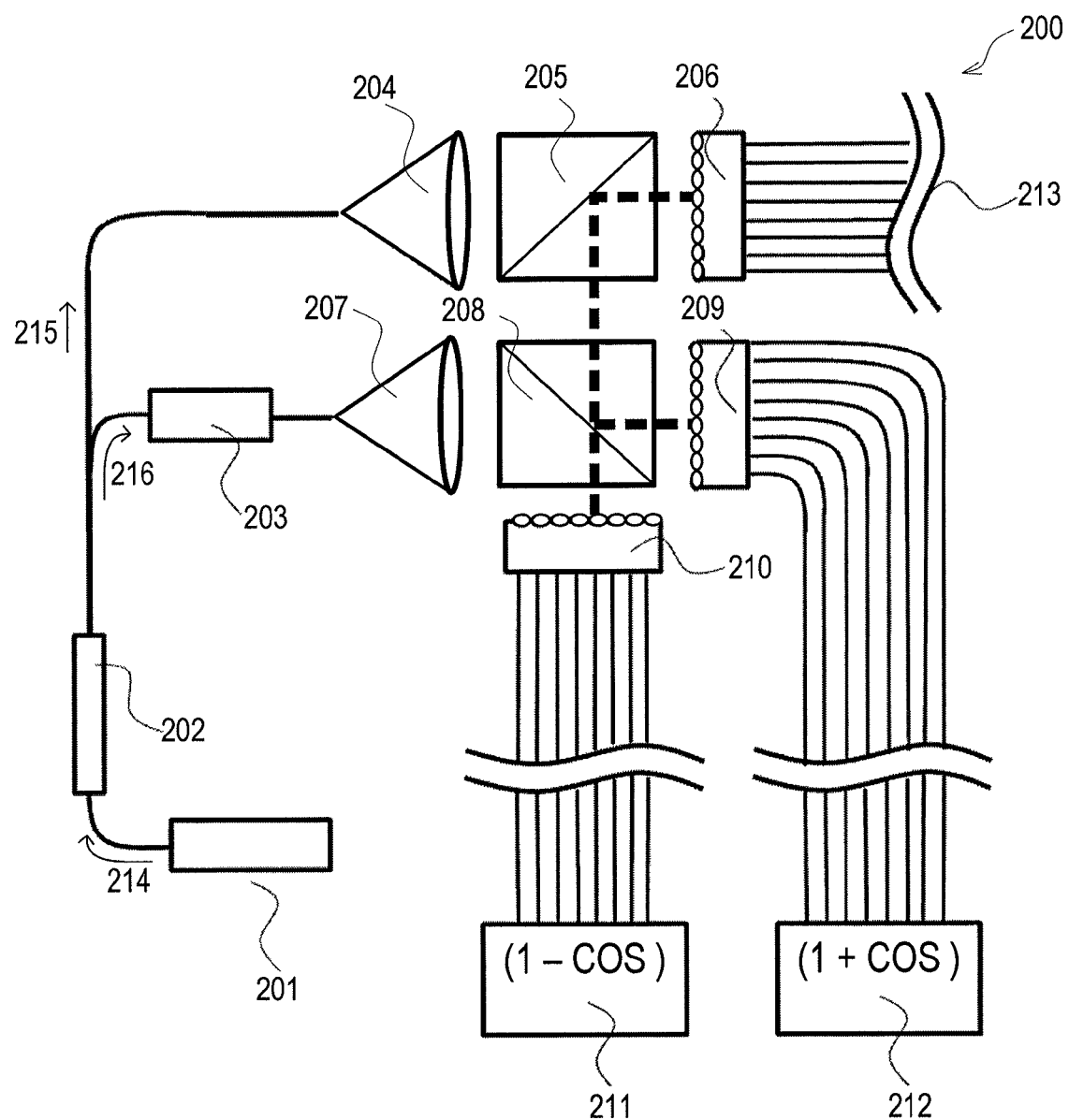
FIG. 2 is a schematic depicting another exemplary embodiment of the present invention's multi-channel interferometer for conformal imaging vibrometry capable of real-time measurements of the dynamic motions of any arbitrary two-dimensional or three-dimensional structure.

FIG. 2 is a schematic depicting another exemplary embodiment of the present invention's multi-channel interferometer for conformal imaging vibrometry capable of real-time measurements of the dynamic motions of any arbitrary two-dimensional or three-dimensional structure. Multi-channel interferometer 200 can be implemented into the exemplary embodiment of the present invention's system in FIG. 1A by replacing multi-channel interferometer 117 in FIG. 1A. In the exemplary embodiment of FIG. 2, multi-channel interferometer 200 is a hybrid fiber-bulk optic multi-channel heterodyne interferometer, such as a hybrid fiber-bulk optic multi-channel Mach-Zehnder heterodyne interferometer. As a hybrid fiber-bulk optic multi-channel heterodyne interferometer, multi-channel interferometer 200 has a fiber optic architecture extending between (a) laser source 201 and modulator 203, and (b) receivers 211-212 and multi-channel digitizer 112.

Multi-channel interferometer 200 has a laser source 201, a fiber-optics splitter 202, a modulator 203, collimating telescopes 204 and 207, a polarizing beam splitter 205, a non-polarizing beam splitter 208, collimating arrays 206, 209, and 210, and receivers 211 and 212.

Laser source 201 emits laser beam 214. Like laser source 101, laser source 201 can be a narrow linewidth fiber laser. Laser source 101, 201 and the fiber-optics components can be implemented at any visible laser wavelengths, such as 532-nm or 633-nm or near-infrared and infrared laser wavelengths such as 800-nm, 1060-nm, 1300-nm or 1550-nm. However, system operation at 1550-nm has important advantages because (i) a wide variety of fiber optic components at this wavelength can be adapted from the telecommunication field and are commercially available, off-the-shelf items, (ii) Class 1 eye safe designation permits the use of higher optical power to enhance the return reflected signal and, therefore, the sensitivity and the signal to noise of the system, (iii) smaller detection bandwidths for a given vibration frequency and amplitude, and (iv) availability of compact semiconductor or fiber lasers providing high power and narrow line-width.

Fiber-optics splitter 202 splits laser beam 214 into an object beam 215 and a reference beam 216. Fiber-optics splitter 202 can be a 1×2 fiber-optics splitter. The fiber-optics splitter 202 can be of any split ratio.

Modulator 203 offsets the frequency of reference beam 216 required for FM carrier generation. Modulator 203 can be a waveguide phase modulator. Modulator 203 can be a highly compact and electronically efficient lithium-niobate waveguide phase modulator. In a lithium-niobate waveguide phase modulator, the reference beam is phase modulated by a serrodyne voltage ramp applied to the electrodes of this phase modulator. Alternatively, modulator 203 can be a serial configuration of two acousto-optic modulators, such as Bragg cells, plus dual radiofrequency (RF) drivers. Modulator 203 can also be any other optical fiber phase modulator capable of implementing a heterodyne carrier modulation scheme.

Collimating telescope 204 collimates object beam 215. Collimated object beam 215 is then transmitted to polarizing beam splitter 205. Collimating telescope 207 collimates reference beam 216. Collimated reference beam 216 is then transmitted to non-polarizing splitter 208. Collimating telescopes 204 and 207 can be fiber pigtailed collimating telescopes.

Object beam 215 from polarizing beam splitter 205 illuminates collimating microlens array 206. Polarizing beam splitter 205 can be a polarizing beam splitting cube. Collimating array 206 can be a collimating microlens array which is aligned to a two-dimensional (2D) fiber array. With microlens fill-factors approaching 98%, object beam 215 is efficiently coupled into the multiple channels of the interferometer array. Object beam 215 is then guided to the conformal illuminating probes, such as conformal illuminating probes 108a-108h. In FIG. 2, identifier 213 represents the connections to the respective conformal illuminating probes 108a-108h.

Non-polarizing beam splitter 208 splits reference beam 216 into two collimated reference beams, each of which couple to its respective collimating arrays 209 and 210. Collimating arrays 209 and 210 can each be a collimating microlens array which is aligned to a two-dimensional (2D) fiber array. Non-polarizing beam splitter 208 can be a non-polarizing beam splitting cube.

Optical signals scattered back from the surface of a test object, such as test object 109, are re-coupled back into the respective conformal illuminating probes 108a-108g, and subsequently carried back to multi-channel interferometer 200. Collimating array 206 collimates these returned optical signals and subsequently mixes in each fiber of the array with the respective coupled phase modulated reference light.

The mixed signals are then fiber guided to a distributed receiver array, such as receivers 211 and 212, where the analog outputs are subsequently digitized and demodulated using standard FM or similar schemes to recover the baseband velocities from the carrier signals. Receivers 211 and 212 can be photo-receivers. This dual receiver array constitutes a balanced detection scheme which improves signal to noise by cancelling common mode effects such as relative intensity noise (RN) while doubling the amplitude of the baseband signal. Where balanced detection is not critical, a single receiver array may be employed at the expense of 3 dB optical losses suffered at the unused output port.

The output signals from receivers 211 and 212 are fed to a series of trans-impedance amplifiers and subsequently sent to a multi-channel receiver array, such as multi-channel receiver array 112 of FIG. 1A. The outputs from multi-channel receiver array 112 comprise the signals of the heterodyne carrier and contain sideband modulation signals associated with the object vibrations. These outputs are transferred to computer 113 having (i) a multi-channel digitizer for digitizing the signals received from multi-channel receiver array 112, (ii) a microprocessor for digital signal processing and data analysis of the conformal imaging vibrometry, and (iii) a computer display. Recovery of the baseband displacements or velocities of the test structure at each of the illuminated points is performed in software by, for example, digital I and Q (in-phase and quadrature) demodulation, but may similarly employ a variety of other heterodyne demodulation methods. The baseband velocity-time data for each point in the conformal array can be replayed by computer 113. Further time and frequency domain analysis may be employed to reveal specific aspects of the object dynamics such as modal coalescence, splitting, damping and environmental sensitivities.

Figure 3:
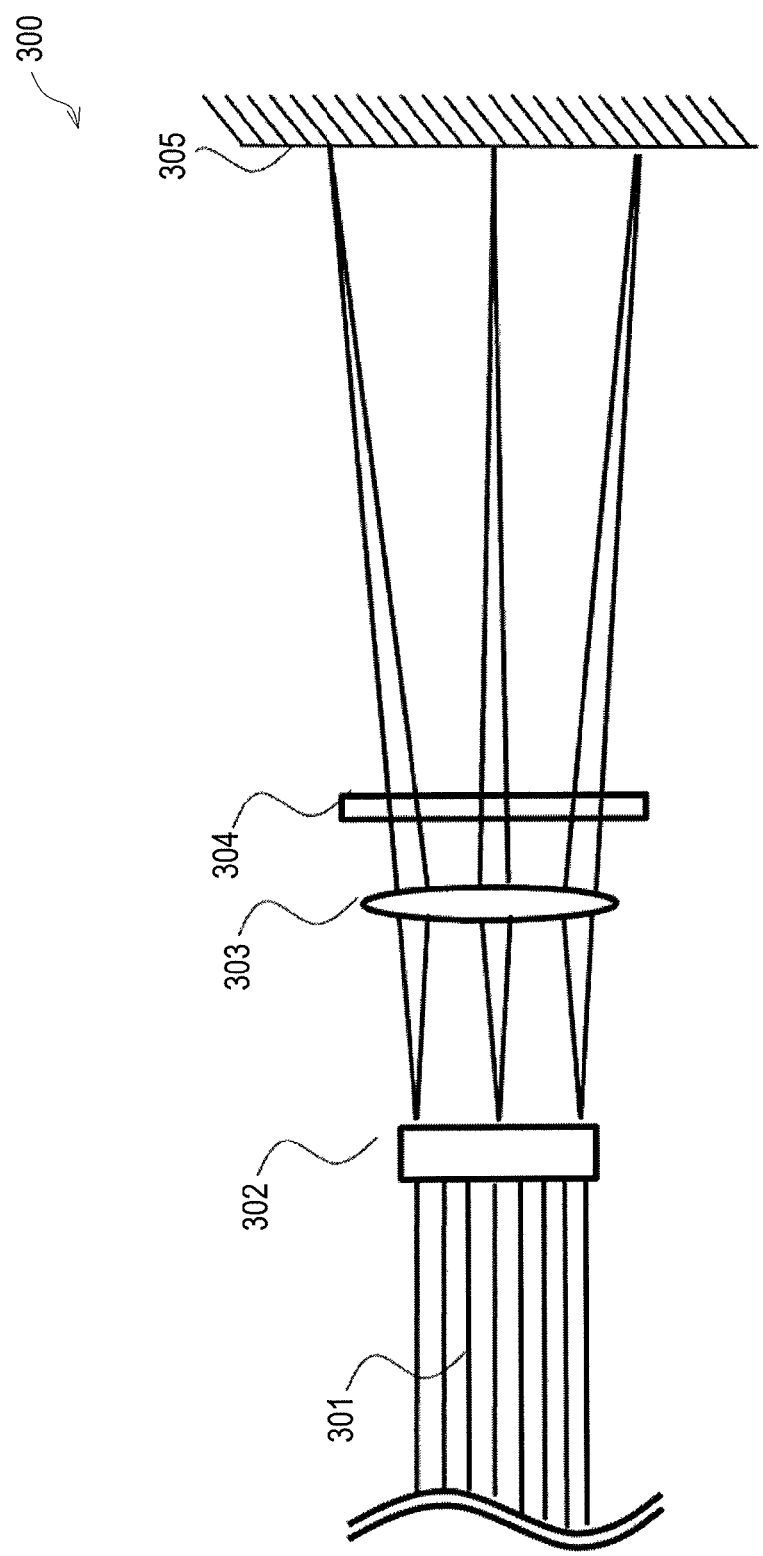
FIG. 3 is a schematic depicting an exemplary embodiment of the present invention's conformal beam illumination scheme and, in particular, a planar conformal array with free space projection employing a polarization maintaining (PM) two-dimensional (2D) fiber array.

FIG. 3 is a schematic depicting an exemplary embodiment of the present invention's conformal beam illumination scheme. A conformal beam illumination scheme employs diffractive optical elements or spatial light modulators followed by free-space projection optics to focus the output beams on a distant object. Such embodiments are suited to planar conformal illumination schemes where the object of interest is substantially planar (or moderately curved) over the illuminated area. Exemplary embodiments of such planar conformal beam illumination schemes are conformal beam illumination schemes 300 and 400, as detailed in FIGS. 3-4. Conformal beam illumination schemes 300 and 400 can be combined with multi-channel interferometers 117 and 200. Conformal beam illumination scheme 119 of FIGS. 1A and 1C is an exemplary embodiment of a radial conformal beam illumination scheme.

In FIG. 3, conformal beam illumination scheme 300 is a planar conformal array with free space projection employing a polarization maintaining (PM) two-dimensional (2D) fiber array. Conformal beam illuminations scheme 300 has fiber array 301, a fiber ferrule 302, a flat-field lens 303, a quarter waveplate 304, and object coverage 305. Fiber array 301 is a PM 2D fiber array having object beams from planar conformal illuminating probes connected to multi-channel interferometer 117 or 200. Next, the object beams from fiber array 301 terminate into fiber ferrule 302. Fiber ferrule 302 can be a two-dimensional (2D) fiber ferrule.

Next, the object beams from fiber ferrule 302 are imaged by flat-field lens 303. Flat-field lens 303 can be an F-theta lens whose magnification is determined according to the desired working distance and object coverage. After the object beams pass through flat-field lens 303, quarter waveplate 304 is employed so that the incident 's' polarization is returned in the orthogonal 'p' mode whereupon it is reflected by, for example, polarizing beam splitter 205 of FIG. 2 towards receivers 211 and 212 of FIG. 2. After quarter waveplate 304, the object beams focus on object coverage 305. The reflected light from object coverage 305 passes through the aforementioned elements and back to the multi-channel interferometer, such as multi-channel interferometer 117 or 200.

Figure 4:
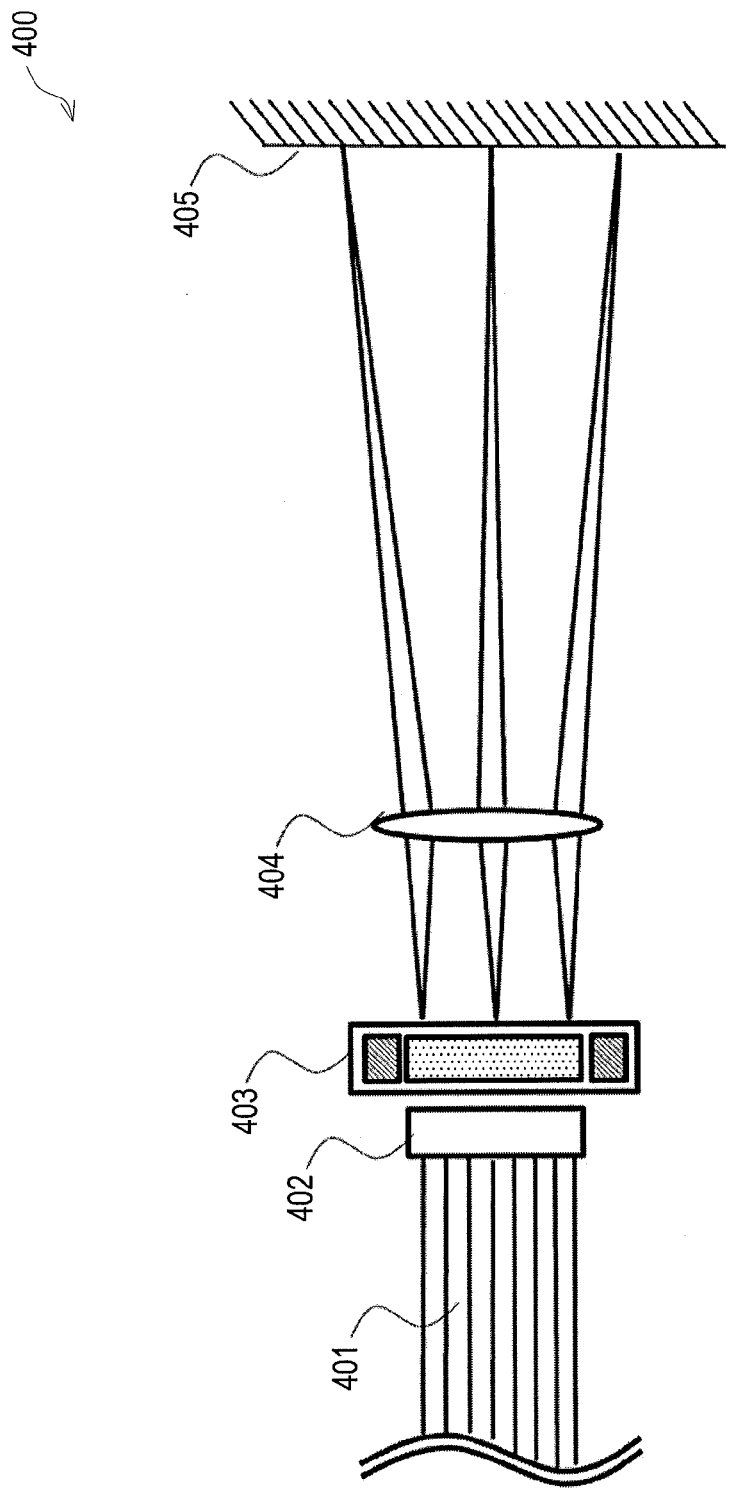
FIG. 4 is a schematic depicting another exemplary embodiment of the present invention's conformal beam illumination scheme and, in particular, a planar conformal array with free space projection employing a single mode (SM) fiber array.

FIG. 4 is a schematic depicting another exemplary embodiment of the present invention's conformal beam illumination scheme. In FIG. 4, conformal beam illumination scheme 400 is a planar conformal array with free space projection employing a single mode (SM) fiber array. Conformal beam illuminations scheme 400 has a fiber array 401, a fiber ferrule 402, a Faraday rotator 403, a flat-field lens 404, and object coverage 405. Fiber array 401 is an SM fiber array having object beams delivered from multi-channel interferometer 117 or 200. Next, the object beams from fiber array 401 terminate into fiber ferrule 402. Fiber ferrule 402 can be a two-dimensional (2D) fiber ferrule. Next, the object beams from fiber ferrule 402 pass through Faraday rotator 403, and subsequently are imaged by flat-field lens 404. Flat-field lens 404 can be an F-theta lens whose magnification is determined according to the desired working distance and object coverage. After flat-field lens 404, the object beams focus on object coverage 405.

The reflected light from object coverage 405 passes through the aforementioned elements and back to the multi-channel interferometer, such as multi-channel interferometer 117 or 200. In particular, the reflected light from object coverage 405 passes through Faraday rotator 403 returning in the orthogonal polarization mode whereupon the polarization drifts which are common in SM fiber are exactly reversed on return. The emergent linear orthogonal polarized light is then similarly reflected by, for example, polarizing beam splitter 205 of FIG. 2 towards receivers 211 and 212 of FIG. 2.

FIGS. 1-4 present exemplary embodiments of the present invention's systems, multi-channel interferometers, and conformal beam illumination schemes for conformal imaging vibrometry capable of real-time measurements of the dynamic motions of any arbitrary two-dimensional or three-dimensional structure. The application of the present invention may in practice range from real-time characterization of micro-scale MEMS resonators up to limit cycle oscillations associated with wing tip flutter. Thus, as discussed, different configurations of these exemplary embodiments can be achieved by different combinations of (a) different multi-channel interferometers, such as multi-channel interferometers 117 and 200, with (b) different conformal beam illumination schemes, such as conformal beam illumination schemes 300 and 400. The preferred configuration depends on the particular structure of the test object. For small structures with rapidly varying surface curvatures, a static fiber array may be employed as in FIGS. 1A-1C where a fixed fiber adapter (in the illustrated case, radial) is employed to conform the fiber array to the surface geometry. In the case of convoluted surface shapes, the static fiber adapter may be fabricated by surface molding techniques to conform closely to the desired geometry. For both large and small structures with modest curvature over the area of interest, the planar conformal probe may be employed with or without projection optics, respectively. Any of these applications may employ multi-channel interferometers 117 and 200 according to channel density requirements where the scheme of FIG. 2 or variations thereof may be more readily extended to high channel counts (hundreds) in a relatively compact format.

Figure 5:
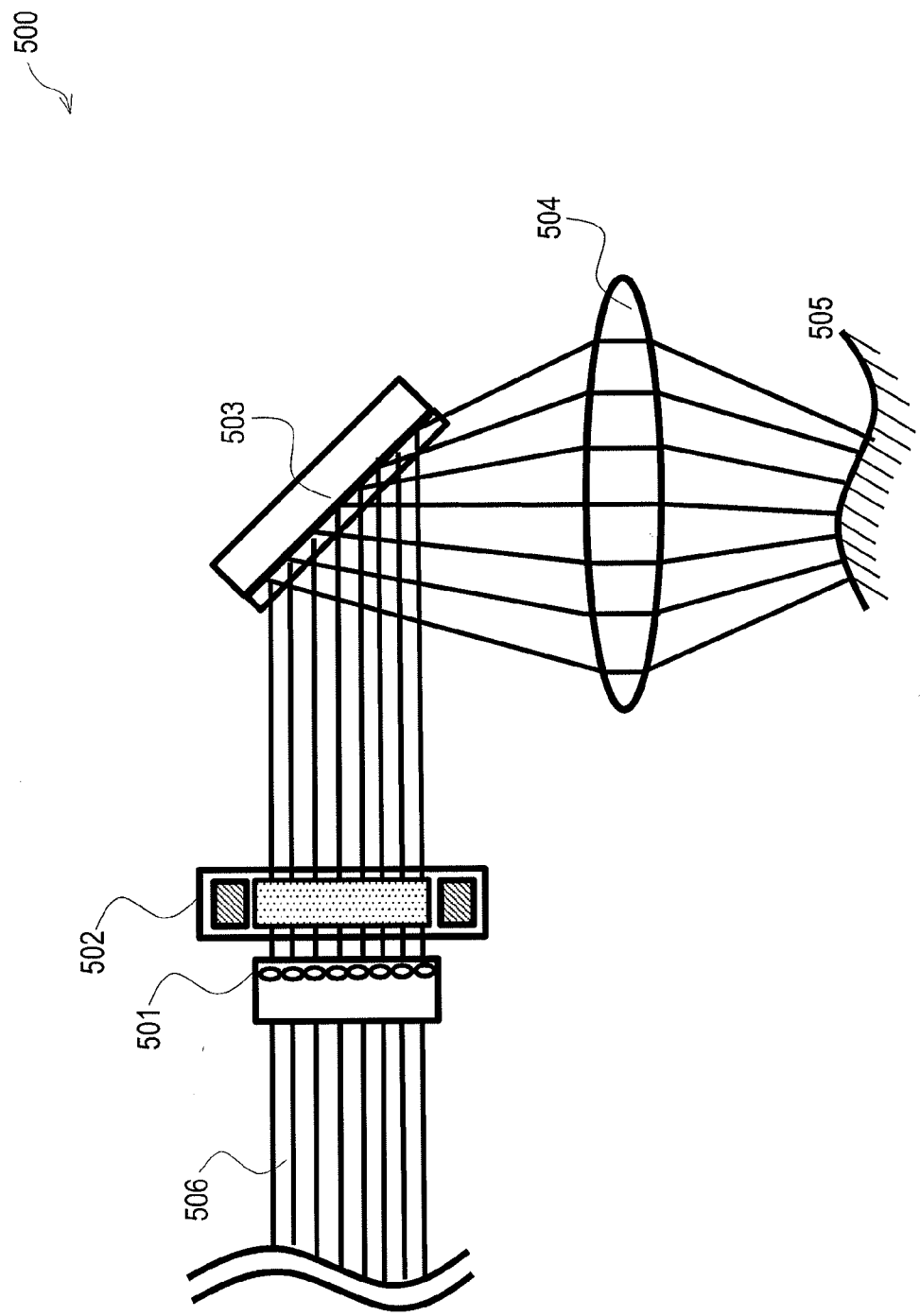
FIG. 5 is a schematic depicting another embodiment of the present invention's conformal beam illumination scheme and, in particular, a dynamically reconfigurable conformal beam illumination with two-dimensional (2D) MEMS mirror.

FIG. 5 is a schematic depicting another exemplary embodiment of the present invention's conformal beam illumination scheme. In FIG. 5, conformal beam illumination scheme 500 is a dynamically reconfigurable conformal illumination with a two-dimensional (2D) MEMS mirror. Conformal beam illumination scheme 500 can be combined with the exemplary embodiments of FIGS. 1-2, such as system 100 and multi-channel interferometers 117 and 200.

Conformal beam illumination scheme 500 provides a greater degree of flexibility than the fixed or static configurations of conformal beam illumination schemes 119, 300, and 400. For example, fiber optic switches have been developed for high density telecommunications channel multiplexing. As shown in FIG. 5, these switches employ high density fiber optic collimating arrays, such as collimating array 501, in order to switch the signal from any given output channel to any arbitrary channel of a matched collimating fiber input array. The beam steering element in fiber optic switches typically comprises an array of a two-dimensional (2D) steerable (XY) MEMS mirrors, such as micro mirror array 503, which can be independently controlled.

Conformal beam illumination scheme 500 has a fiber array 506, collimating array 501, a Faraday rotator 502, a micro mirror array 503, an objective lens 504, and a convoluted object surface 505. Fiber array 506 can be a SM fiber array having object beams delivered from multi-channel interferometer 117 or 200. Next, the object beams from fiber array 506 terminate into collimating array 501. Collimating array 501 can be a two-dimensional (2D) fiber ferrule with matched microlens array. Next, the object beams from collimating array 501 pass through Faraday rotator 502 and subsequently, illuminate micro mirror array 503. Micro mirror array 503 can be a two-dimensional (2D) steerable (XY) MEMS micro mirror array. Micro mirror array 503 is then used to independently steer the object beams into a conformal illuminating pattern which is then projected and focused onto convoluted object surface 405 comprising positive and negative curvatures by objective lens 504 such that the incident beams are everywhere normal to the surface. The ability to rapidly configure micro mirror array 503 for different or even variable structural profiles might further employ additional surface profiling capability using a variety of structured lighting methods.

Conformal beam illumination scheme 500 may also readily be employed to provide an extremely versatile reconfigurable beam pattern configured according to the shape of the test object with the measurement beam pattern and density varied according to specific areas of interest. The output pattern can therefore be switched from two-dimensional (2D) square, rectangular, linear, circular or concentric circular according to the exact shape of the test object which may include inclusions or voids for which the return signal might otherwise be lost. For short working distances or with the aid of additional optics, the angles of incidence for any group of three (3) marginal channels may be sufficient to direct three (3) beams to any single point of coincidence in order to recover the full surface velocity vector (out-of plane (Z) and in-plane (X&Y)).

Figure 6:
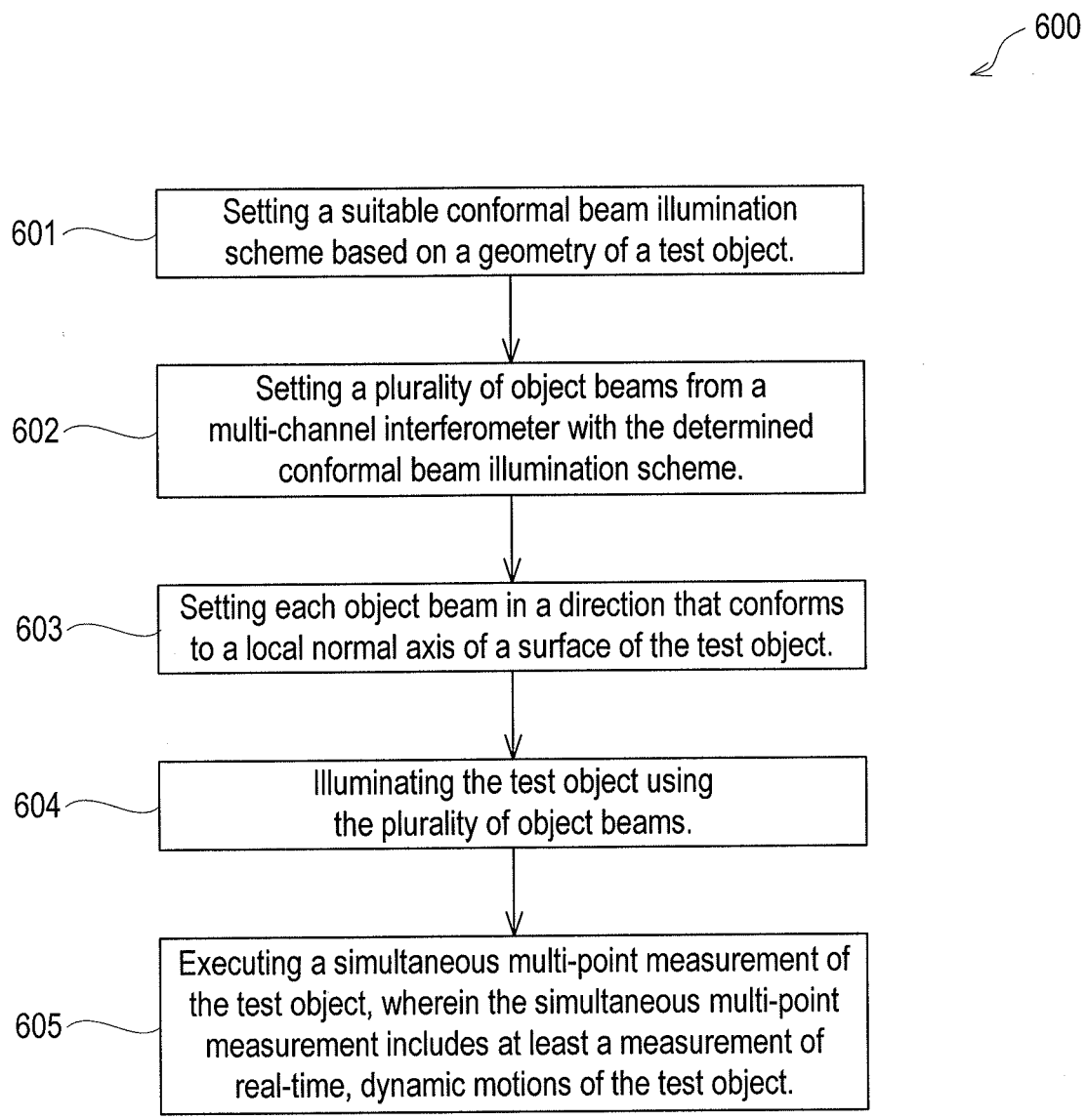
FIG. 6 is a flowchart depicting an exemplary embodiment of the present invention's method for conformal imaging vibrometry capable of real-time measurements of the dynamic motions of any arbitrary two-dimensional or three-dimensional structure.

FIG. 6 is a flowchart depicting an exemplary embodiment of the present invention's method for conformal imaging vibrometry capable of real-time measurements of the dynamic motions of any arbitrary two-dimensional or three-dimensional structure. This present invention's method, such as method 600, provides the ability to fully characterize the dynamic behavior of an object of any arbitrary geometry, deploying a laser beam array tailored to the specific structural geometry of interest, such as planar, circular, cylindrical, spherical or an arbitrary curved/warped two-dimension (2D) surface or three-dimensional (3D) surface.

As shown in FIG. 6, method 600 comprises steps 601 to 605. At step 601, a suitable conformal beam illumination scheme is selected based on a geometry of a test object. Various exemplary embodiments of the present invention's conformal beam illumination schemes have been disclosed, such as conformal beam illumination schemes 119, 300, 400, and 500. If the geometry of the test object is substantially planar, or moderately curved, then a planar conformal beam illumination scheme is suitable. An example of such test object would be a large or a small structure with modest curvature over the area of interest. Conformal beam illumination schemes 300 and 400 of FIGS. 3-4 are exemplary embodiments of the present invention's planar conformal beam illumination schemes.

If the geometry of the test object is not substantially planar, or not moderately curved, then a conformal beam illumination scheme is suitable. An example of such test object would be a small structure with rapidly varying surface curvatures. Conformal beam illumination scheme 119 of FIG. 1C is an exemplary embodiment of the present invention's radial conformal beam illumination scheme. Additionally, if the test object has convoluted surface shapes, a static fiber adapter may be fabricated by surface molding techniques to conform closely to the desired geometry. Conformal beam illumination schemes 119, 300, and 400 are exemplary embodiments of fixed or static configurations.

If the test object has a greater degree of varying curvature, then a conformal beam illumination scheme permitting a greater degree of flexibility than a fixed or static configuration is suitable, such as a dynamically reconfigurable conformal beam illumination scheme. Conformal beam illumination scheme 500 is an exemplary embodiment of the present invention's dynamically reconfigurable conformal beam illumination with two-dimensional (2D) MEMS mirror.

At step 602, a plurality of object beams from a multi-channel interferometer are set in accordance with the selected conformal beam illumination scheme. Depending on the selected conformal beam illumination scheme, the plurality of object beams can be configured for diverging, converging or collimated illumination. Multi-channel interferometers 117 and 200 are exemplary embodiments of the interferometers deployed in the present invention's system. If conformal beam illumination scheme 119 is selected, then conformal illuminating probes 108a-108g can be arranged radially around the test object such that each object beam from each probe will illuminate a different point on the test object, as shown in FIG. 1C. As previously articulated, conformal illuminating probes 108a-108g can be radial, circular, cylindrical, or spherical conformal illuminating probes depending on the geometry of the test object. If either of conformal beam illumination schemes 300 or 400 is selected, then object beams from radial conformal illuminating probes are arranged as shown in FIGS. 3-4. If conformal beam illumination scheme 500 is selected, then object beams from dynamically reconfigurable conformal illuminating probes are arranged as shown in FIG. 5.

At step 603, each object beam is set in a direction that conforms to a local normal axis of a surface of the test object. By way of example, if conformal beam illumination scheme 119 is selected, then conformal illuminating probes 108a-108g are arranged so that the direction of the respective object beams from the probes conform to the local normal axis of the surface at the respective point on the test object. This approach enables high-speed vibration imaging of whole-body dynamics of arbitrarily shaped structures in real-time, with no multiplexed data capture or synthesized motion reconstruction, as is currently practiced.

At step 604, the test object is illuminated by the plurality of object beams. By way of example, if conformal beam illumination scheme 119 is selected, then the plurality of object beams from conformal illuminating probes 108a-108g illuminate the test object radially, as shown in FIG. 1C. Laser source 101 provides the illumination source for the plurality of object beams from conformal illuminating probes 108a-108g.

At step 605, executing a simultaneous multi-point measurement of the test object, wherein the simultaneous multi-point measurement includes at least a measurement of real-time, dynamic motions of the test object. Additionally, in an alternative embodiment, the simultaneous multi-point measurement further includes measurements of the test object's displacement, velocity, vibration, and acceleration in a steady-state, a short-lived state, a non-periodic state, a chaotic state, a transient state, or any combinations thereof. Additionally, the simultaneous multi-point measurements can be dispersed in sufficient number to fully spatially image surface deformations and vibrations of the test object.

By measuring test object 109's vibrations simultaneously at multiple points, system 100 is able to reproduce the structural behavior under operational conditions, which can then be spectrally decomposed to determine the modal, complex modal and transient nature of the true structural dynamics. The speed at which these measurements can be made permits a wide range of further characterization tests. For example, the effect of pressure and temperature variations on the object's dynamics can be studied in real-time, where previously these parameters had to be held or assumed constant throughout the measurement process. In this exemplary embodiment of FIG. 1, system 100 uses heterodyne interferometry (i.e. multi-channel interferometer 117), in which the velocity of the vibrating surface is encoded in the Doppler sidebands of a frequency modulated carrier. The microprocessor, such as the microprocessor in computer 113, recovers the displacement (or velocity) data by demodulating the measured, digitized signals to yield the local surface displacement (or velocity) time histories, while the full data set provides an animated display of the real-time surface deformation (or velocity) of the sample under transient (or, in fact, arbitrary) stimulus. In addition to general application, system 100 is uniquely applicable to the capture of short-lived, chaotic or transient surface movement or other vibrations which are not currently amenable to study by the current state-of-the-art.

Similar benefits and capabilities might accrue from integration of other methods to dynamically manipulate and individually reposition the measurement fibers on a case-by-case basis to accommodate different diameter structures and/or different structural geometries. Accommodating variable configurations would require, for example, that the manipulator have the ability to translate the measurement probes toward or away from the test surface and to incline the measurement fibers at any desired angle.

Figure 7:
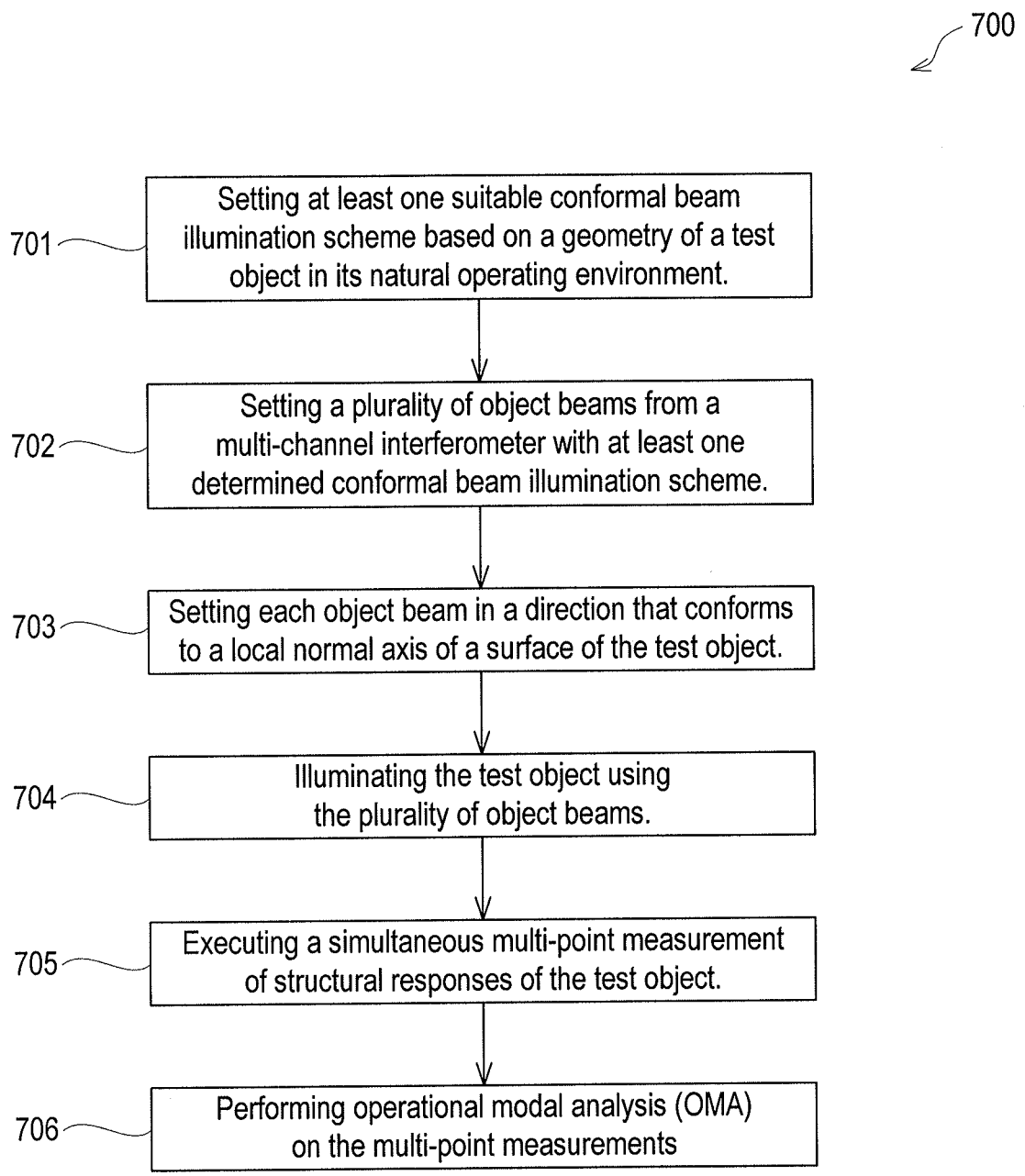
FIG. 7 is a flowchart depicting another exemplary embodiment of the present invention's method for conformal imaging vibrometry capable of real-time measurements of the dynamic motions of any arbitrary two-dimensional or three-dimensional structure.

FIG. 7 is a flowchart depicting another exemplary embodiment of the present invention's method for conformal imaging vibrometry capable of real-time measurements of the dynamic motions of any arbitrary two-dimensional or three-dimensional structure using operational modal analysis (OMA). Such method is depicted as method 700 in FIG. 7. OMA is also known as output-only modal analysis. A comparatively recent field of study concerns the method of QMA, wherein vibration measurements are performed directly on structures in their natural (operating) environment. The application of traditional modal analyses under such conditions is generally prohibited because of difficulties associated with accurately measuring the input-forcing functions. In their natural environment, the input stimuli may come from multiple sources and include combinations of steady state, broadband and transient sources. The method of operational modal analyses sometimes referred to as output only modal analysis has been developed to analyze the modal behavior structures in the normal operating environment. OMA assumes that the input-forcing functions are not known, or cannot be measured, and instead measures the structural response (outputs) at multiple locations simultaneously, typically using accelerometer arrays. The disclosed conformal imaging vibrometer, such as system 100 of FIG. 1, offers a non-contact alternative for the application of OMA on structures whose dynamics may be affected by the additional load associated with surface-mounted accelerometers. For more general application of OMA, the conformal imaging vibrometer, such as system 100 of FIG. 1, offers rapid acquisition of multi-point vibration spectra, providing the basis for an optical (non-contact) implementation of operational modal analysis in addition to the practical benefit of avoiding lengthy preparations involved in mounting and removing accelerometer arrays.

As shown in FIG. 7, method 700 comprises steps 701 to 705. At step 701, a suitable conformal beam illumination scheme is selected based on a geometry of a test object in its natural environment. Various exemplary embodiments of the present invention's conformal beam illumination schemes have been disclosed, such as conformal beam illumination schemes 119, 300, 400, and 500. If the geometry of the test object is substantially planar, or moderately curved, then a planar conformal beam illumination scheme is suitable. An example of such test object would be a large or a small structure with modest curvature over the area of interest. Conformal beam illumination schemes 300 and 400 of FIGS. 3-4 are exemplary embodiments of the present invention's planar conformal beam illumination schemes.

If the geometry of the test object is not substantially planar, or not moderately curved, then a conformal beam illumination scheme is suitable. An example of such test object would be a small structure with rapidly varying surface curvatures. Conformal beam illumination scheme 119 of FIG. 1C is an exemplary embodiment of the present invention's radial conformal beam illumination scheme. Additionally, if the test object has convoluted surface shapes, a static fiber adapter may be fabricated by surface molding techniques to conform closely to the desired geometry. Conformal beam illumination schemes 119, 300, and 400 are exemplary embodiments of a fixed or static configuration.

If the test object has a greater degree of varying curvature, then a conformal beam illumination scheme permitting a greater degree of flexibility than a fixed or static configuration is suitable, such as a dynamically reconfigurable conformal beam illumination scheme. Conformal beam illumination scheme 500 is an exemplary embodiment of the present invention's dynamically reconfigurable conformal beam illumination with two-dimensional (2D) MEMS mirror.

At step 702, a plurality of object beams from a multi-channel interferometer are set in accordance with the selected conformal beam illumination scheme. Multi-channel interferometers 117 and 200 are exemplary embodiments of the interferometers deployed in the present invention's system. If conformal beam illumination scheme 119 is selected, then conformal illuminating probes 108a-108g are arranged radially around the test object such that each object beam from each probe will illuminate a different point on the test object, as shown in FIG. 1C. If either conformal beam illumination scheme 300 or 400 is selected, then object beams from planar conformal illuminating probes are arranged as shown in FIGS. 3-4. If conformal beam illumination scheme 500 is selected, then object beams from dynamically reconfigurable conformal illuminating probes are arranged as shown in FIG. 5.

At step 703, each object beam is set in a direction that conforms to a local normal axis of a surface of the test object. By way of example, if conformal beam illumination scheme 119 is selected, then conformal illuminating probes 108a-108g are arranged so that the direction of the respective object beams from the probes conforms to the local normal axis of the surface at the respective point on the test object. This approach enables high-speed vibration imaging of whole-body dynamics of arbitrarily-shaped structures in real-time, with no multiplexed data capture or synthesized motion reconstruction, as is currently practiced.

At step 704, the test object is illuminated by the plurality of object beams. By way of example, if conformal beam illumination scheme 119 is selected, then the plurality of object beams from conformal illuminating probes 108a-108g illuminates the test object radially, as shown in FIG. 1. Laser source 101 provides the illumination source for the plurality of object beams from conformal illuminating probes 108a-108g.

At step 705, executing a simultaneous multi-point measurement of structural responses of the test object, wherein the simultaneous multi-point measurement includes at least a measurement of real-time, dynamic motions of the test object. Additionally, in an alternative embodiment, the simultaneous multi-point measurement further includes measurements of the test object's displacement, velocity, vibration, and acceleration in a steady-state, a short-lived state, a non-periodic state, a chaotic state, a transient state, or any combinations thereof. Additionally, the simultaneous multi-point measurements can be dispersed in sufficient number to fully spatially image surface deformations and vibrations of the test object.

At step 706, an operational modal analysis is performed on the multi-point measurements.

Figure 8:
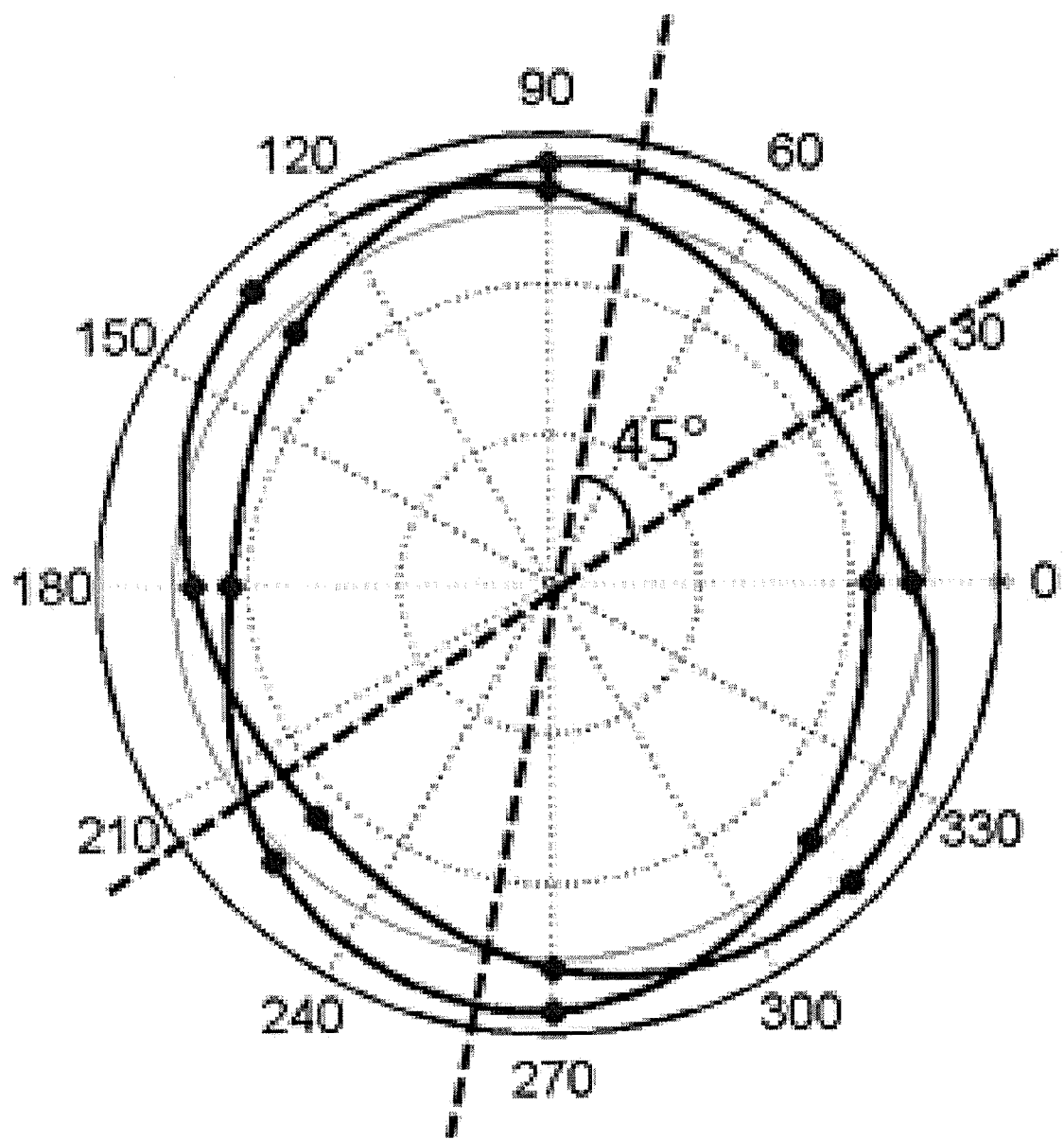
FIG. 8 shows experimental data in which the present invention's CIV, system 100, was configured to support dynamic imaging of real-time structural behavior of micro vibratory resonators.

FIG. 8 shows experimental data in which the present invention's CIV, system 100, was configured to support dynamic imaging of real-time structural behavior of micro vibratory resonators. System 100 was employed to measure the spatio-temporal dynamics of a 5-mm diameter wineglass micro-resonator test object. As shown in FIG. 1C, conformal illuminating probes 108a-108h were arranged in the close proximity of the micro-resonator test object such as the diverging beams exciting the PM fibers (numerical aperture=0.12) were approximately normally incident to the test surface, allowing the measurement of the out-of-plane motion in the equatorial plane of the micro-resonator. The particular micro-resonator geometry requires a radial conformal array for which purpose eight measuring PM fiber probes were aligned at 45 degree intervals along the equatorial line of the micro-resonator, as depicted in FIG. 1C. As previously discussed, conformal illuminating probes 108a-108h generate an array of eight laser spots on the vibrating test device while the scattered light from each of the measurement points is collected back in the PM fibers probes and mixed with the reference signal at the receiver.

The substrate of the test object was mounted on a piezo electric ceramic disc transducer vibrating in radial mode (a 7 mm diameter×0.5 mm thickness disc). Individual split modes were selectively excited at their corresponding frequencies and the time-displacement (or velocity) distributions were simultaneously recovered at the eight illuminating points. The microprocessor of computer 113 displays the data to show the real-time energy flow around the micro-resonator for any given set of drive conditions. The out-of-plane spatial displacement/velocity time histories are then spline fitted and represented as an animated "movie" that shows the dynamic behavior of the vibrating structure in real time (but reviewed in slow motion).

FIG. 8 represents a single frame of the animated display illustrating the displacement profiles of n=2 non-degenerate mode at maximum displacement during one cycle. The displacements are shown with different scaling factors between the modes for better representation. As expected, the principal axes of elasticity for the split n=2 mode are separated by 45 degrees. The data provides not a qualitative "image," but a quantitative diagnostic map of the entire structural velocity, whose complete temporal evolution is contained in the entire captured sequence. In addition to providing dynamic time-domain surface vibration profiles, the data may be analyzed in a frequency domain in order to further characterize the dynamic spatial modal content of the structural vibrations (resonant modes, high harmonics modes, frequency split) or in time domain to determine Q factor and damping axis.

The highly localized passive measurement based on fiber delivery of the optical beam employed in the all-fiber CIV lends itself naturally to vacuum integration. The down-link fibers of the CIV were, accordingly, integrated via a vacuum feed-through port into a vacuum chamber. As the full spatio-temporal nature of the micro device dynamic can be measured in vacuum, CIV is anticipated to serve as a valuable tool in tailoring gyro structural design, electrode placement, and signal drive schemes in order to optimize device performance.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted.

What is claimed is:

1. A system for conformal imaging vibrometry, comprising:
  a plurality of optical elements arranged according to an arbitrary geometry of a structure, each of the plurality of optical elements configured to emit a laser beam to conform to the arbitrary geometry, substantially orthogonally illuminate the structure at multiple locations and receive a plurality of optical signals resulting from light reflected from the structure, each optical signal including information for measuring a surface displacement or a surface velocity at a measurement location on the structure;
  a multi-channel interferometer configured to receive and process the plurality of optical signals received from the plurality of optical elements;
  a multi-channel receiver array configured to receive the plurality of processed optical signals from the multi-channel interferometer and convert the plurality of processed optical signals to a plurality of analog signals having information regarding the surface displacement or the surface velocity at multiple measurement locations on the structure;
  a multi-channel digitizer for converting the plurality of analog signals into a plurality of digital signals having information regarding the surface displacement or the surface velocity at the multiple measurement locations on the structure; and
  a processor configured to process the plurality of digital signals to determine the surface displacement or the surface velocity at the multiple measurement locations on the structure, convert the surface displacements or the surface velocities into a single contiguous displacement or velocity image and sequentially reconstruct a plurality of the contiguous displacement or velocity images to display the real-time structural dynamics of the structure.

2. The system of claim 1, wherein the multi-channel interferometer is a multi-channel heterodyne interferometer configured to optically mix the plurality of optical signals with at least one reference beam.

3. The system of claim 2, wherein the multi-channel heterodyne interferometer is an all-fiber multi-channel heterodyne interferometer having a laser source, an optical isolator, a first fiber-optics splitter configured to split a laser beam emitted from the laser source into an object beam and a reference beam, a modulator, a second fiber-optics splitter configured to split the object beam, wherein the second fiber-optics splitter is a 1-by-N channel fiber-optics splitter, wherein N is any positive integer greater than 2, a third fiber-optics splitter configured to split the reference beam, wherein the third fiber-optics splitter is a 1-by-N channel fiber-optics splitter, wherein N is any positive integer greater than 2, a plurality of fiber-optics circulators, a plurality of fiber-optics re-combiners, and a plurality of receivers configured for receiving signals from the plurality of fiber-optics re-combiners.

4. The system of claim 3, wherein each of the plurality of optical elements has a fiber array and a plurality of conformal illuminating probes.

5. The system of claim 4, wherein at least one of the plurality of conformal illuminating probes has a terminal end with a bare fiber angle polished to any angle from 8 degrees to 45 degrees.

6. The system of claim 4, wherein at least one of the plurality of conformal illuminating probes has a terminal end with a mirrored right-angle micro-prism.

7. The system of claim 4, wherein at least one of the plurality of conformal illuminating probes has a terminal end with a microlens.

8. The system of claim 3, wherein the plurality of optical elements has a plurality of planar conformal illuminating probes, a polarizing maintaining (PM) fiber array, a fiber ferrule, a flat-field lens, and a quarter-waveplate.

9. The system of claim 3, wherein each of the plurality of optical elements has a plurality of planar conformal illuminating probes, a single mode (SM) fiber array, a fiber ferrule, a flat-field lens, and a Faraday rotator.

10. The system of claim 3, wherein each of the plurality of optical elements has a plurality of dynamically reconfigurable conformal illuminating probes, a single mode (SM) fiber array, a collimating array, a Faraday rotator, a steerable micro-electro-mechanical-system (MEMS) mirror array, and an objective lens.

11. The system of claim 2, wherein the multi-channel heterodyne interferometer is a hybrid fiber-bulk optic multi-channel heterodyne interferometer having a laser source, a fiber-optics splitter configured to split a laser beam emitted from the laser source into an object beam and a reference beam, a modulator, at least one collimating telescope configured for collimating the object beam, at least one collimating telescope configured for collimating the reference beam, at least one polarizing beam splitter, at least one non-polarizing beam splitter, a plurality of collimating arrays, and a plurality of receivers.

12. The system of claim 11, wherein each of the plurality of optical elements has a fiber array, and a plurality of conformal illuminating probes.

13. The system of claim 12, wherein at least one of the plurality of conformal illuminating probes has a terminal end with a bare fiber angle polished to any angle from 8 degrees to 45 degrees.

14. The system of claim 12, wherein at least one of the plurality of conformal illuminating probes has a terminal end with a mirrored right-angle micro-prism.

15. The system of claim 12, wherein at least one of the plurality of conformal illuminating probes has a terminal end with a microlens.

16. The system of claim 11, wherein each of the plurality of optical elements has a plurality of planar conformal illuminating probes, a polarizing maintaining (PM) fiber array, a fiber ferrule, a flat-field lens, and a quarter-waveplate.

17. The system of claim 11, wherein each of the plurality of optical elements has a plurality of planar conformal illuminating probes, a single mode (SM) fiber array, a fiber ferrule, a flat-field lens, and a Faraday rotator.

18. The system of claim 11, wherein each of the plurality of optical elements has a plurality of dynamically reconfigurable conformal illuminating probes, a single mode (SM) fiber array, a collimating array, a Faraday rotator, a steerable micro-electro-mechanical-system (MEMS) mirror array, and an objective lens.

19. The system of claim 1, wherein the processor is further configured to perform temporal, spectral, or spatial data analysis to determine the surface displacement or the surface velocity at the multiple measurement locations on the structure.

20. A method for conformal imaging vibrometry, comprising the steps of:
   determining an arrangement of a plurality of optical elements according to a geometry of a test object;
   setting each of the plurality of optical elements according to the determined arrangement to emit a laser beam to conform to the geometry of the test object;
   setting each of the plurality of optical elements in a direction that conforms to a local normal axis of a surface of the test object;
   substantially orthogonally illuminating the test object using the plurality of optical elements; and
   executing a simultaneous multi-point measurement of the test object, wherein the simultaneous multi-point measurement includes at least a measurement of real-time, dynamic motions of the test object.

21. The method of claim 20, wherein at the step of executing the simultaneous multi-point measurement of the test object, the simultaneous multi-point measurements is dispersed according to the geometry of the test object in order to spatially image surface deformations and vibrations of the test object.

22. The method of claim 20, wherein at the step of executing the simultaneous multi-point measurement of the test object, the simultaneous multi-point measurement further includes measurements of the test object's displacement, velocity, vibration, and acceleration in a steady-state, a short-lived state, a non-periodic state, a chaotic state, a transient state, or any combinations thereof.

23. The method of claim 20, further comprising the step of:
   demodulating the simultaneous multi-point measurements using a microprocessor configured for digital signal processing and data analysis.

24. The method of claim 20, wherein at the step of setting each of the plurality of optical elements according to the determined arrangement, each of the plurality of optical elements is configured for diverging illumination.

25. The method of claim 20, wherein at the step of setting each of the plurality of optical elements according to the determined arrangement, each of the plurality of optical elements is configured for converging illumination.

26. The method of claim 20, wherein at the step of setting each of the plurality of optical elements according to the determined arrangement, each of the plurality of optical elements is configured for collimated illumination.

* * * * *